US008844240B2

(12) United States Patent  
Kuchel

(10) Patent No.: US 8,844,240 B2  
(45) Date of Patent: Sep. 30, 2014

(54) METHOD FOR TREATING SOIL

(76) Inventor: Mark Anthony Kuchel, Hyde Park (AU)

(*) Notice: Subject to any disclaimer, the term of this patent is extended or adjusted under 35 U.S.C. 154(b) by 0 days.

(21) Appl. No.: 13/640,811

(22) PCT Filed: Apr. 12, 2011

(86) PCT No.: PCT/AU2011/000421  
§ 371 (c)(1),  
(2), (4) Date: Oct. 12, 2012

(87) PCT Pub. No.: WO2011/127528  
PCT Pub. Date: Oct. 20, 2011

(65) Prior Publication Data  
US 2013/0036689 A1    Feb. 14, 2013

(30) Foreign Application Priority Data  
Apr. 12, 2010    (AU) ................ 2010901539

(51) Int. Cl.  
*E02D 27/08*    (2006.01)  
*E02D 3/12*    (2006.01)  
*E04D 1/00*    (2006.01)

(52) U.S. Cl.  
CPC . *E02D 27/08* (2013.01); *E04D 1/00* (2013.01)  
USPC ...................... 52/741.15; 405/269

(58) Field of Classification Search  
USPC ............... 52/741.11, 741.15, 745.05, 745.21, 52/292, 293.1, 294, 169.1, 2.15; 405/230, 405/263–269  
See application file for complete search history.

(56) References Cited

U.S. PATENT DOCUMENTS

| | | | | |
|---|---|---|---|---|
| 3,927,719 A * | 12/1975 | Maser | ............................. | 169/46 |
| 4,000,621 A * | 1/1977 | Maser | ............................ | 405/269 |
| 5,342,149 A * | 8/1994 | McCabe et al. | ................ | 405/269 |
| 5,375,947 A * | 12/1994 | Gouws et al. | ............... | 405/259.5 |
| 5,927,907 A * | 7/1999 | Shiraishi | ..................... | 405/258.1 |
| 6,695,543 B2 * | 2/2004 | J. | ................................. | 405/267 |
| 6,739,800 B2 * | 5/2004 | Bevilacqua | ..................... | 405/48 |
| 7,645,097 B2 * | 1/2010 | Canteri et al. | ................. | 405/267 |
| 7,806,631 B2 * | 10/2010 | Smith et al. | ..................... | 405/267 |
| 2001/0002970 A1 * | 6/2001 | Pizzorni et al. | ............. | 405/128.3 |
| 2005/0081459 A1 * | 4/2005 | Moroschan | .................. | 52/169.1 |
| 2006/0275087 A1 * | 12/2006 | Trout | ............................. | 405/267 |
| 2008/0205995 A1 * | 8/2008 | Canteri et al. | ................. | 405/263 |
| 2009/0142140 A1 * | 6/2009 | Collina et al. | ................. | 405/230 |
| 2009/0304457 A1 * | 12/2009 | Shimada et al. | .............. | 405/269 |

FOREIGN PATENT DOCUMENTS

| | | | |
|---|---|---|---|
| CA | 2648820 A1 * | 7/2010 | |
| DE | 3332256 A1 | 9/1984 | |
| EP | 1914350 A1 | 4/2008 | |
| JP | 8260500 A | 10/1996 | |
| JP | 2000303488 A | 10/2000 | |
| JP | 2006070513 A | 3/2006 | |
| WO | 02064893 A1 | 8/2002 | |

* cited by examiner

*Primary Examiner* — William Gilbert  
*Assistant Examiner* — Kyle Walraed-Sullivan  
(74) *Attorney, Agent, or Firm* — David A. Guerra

(57) ABSTRACT

A method of effecting a stabilization and effecting a lifting of a portion of a footing of a building which includes the steps of effecting an introduction of water resistant plastics into soil and openings in the soil in the vicinity of the footing to seal these areas, then introducing a slow setting plastics catalysed monomer to beneath the footing at a very high pressure.

18 Claims, 24 Drawing Sheets

METHOD FOR TREATING SOIL

CROSS-REFERENCE TO RELATED APPLICATIONS

This application is an U.S. national phase application under 35 U.S.C. §371 based upon co-pending International Application No. PCT/AU2011/000421 filed on Apr. 12, 2011. Additionally, this U.S. national phase application claims the benefit of priority of co-pending International Application No. PCT/AU2011/000421 filed on Apr. 12, 2011 and Australia Application No. 2010901539 filed on Apr. 12, 2010. The entire disclosures of the prior applications are incorporated herein by reference. The international application was published on Oct. 20, 2011 under Publication No. WO 2011/127528 A1.

TECHNICAL FIELD

The present invention relates to a method for treating soils and in particular providing stabilization of footings and effecting controlled lifting.

BACKGROUND ART

The problem to which this invention is directed relates to problems associated with soil instability.

One example of treatment of soils is described in Australian Patent No 731637. This describes the use of a quickly expanding chemical which is inserted into the ground.

The extent of expansion is also chosen to be large for example some five times more than an inserted volume. Once this very active chemical is inserted into the ground any lifting effect is achieved by a continuing chemically induced expansion and a lifting effect thereby.

The problem with this concept is that one loses control once the chemical is inserted into the soil and the amount of lift then is dependent on the extent of chemically induced expansion. If it is too much then this creates significant difficulty. This example refers to monitoring of soil lift but by the time one notices soil lifting there is little one can do to stop further lifting if the chemical is still expanding.

OBJECT OF THIS INVENTION

An object of this invention is to provide a method of treating soils which allows for better control of an extent of lift that might be obtained.

DISCLOSURE OF THE INVENTION

In one form of our invention this can be said to reside in a method of effecting a stabilization of a portion of a footing of a building which includes the steps of effecting an introduction of water resistant plastics into soil and openings in the soil in the vicinity of the footing, then introducing a slow setting plastics catalysed monomer to beneath the footing with a very high pressure pump.

In preference the catalysed monomer is a foaming urethane plastics. The extent of foaming is chosen to provide some aeration within the resultant material and assist therefore in providing resilience but is chosen and formulated to act slowly.

Accordingly this allows for much more control in circumstances where there are a number of unpredictable variables.

In an alternative form this invention can be said to reside in a method of using high pump pressure and low rate of flow 'two part' Urethane with Low Viscosity, and slow chemical set time, pumped into soils such as clay and clay composite soils consecutively into the same spot in the soil to initially form a Urethane Balloon.

When it has all but set, pumping again in to the same spot with again a very high external pressure, will form a balloon within the first balloon. The first Balloon will be collapsed from within, pressed out to the soil forming a Bladder or Tube like arrangement. Consecutive cycles of the same thing are then used to form in preference a quite large lined surface area.

This, in preference, is done as a 'curtain effect' under a wall line load, so that the hydraulic like effect, will in fact lift the wall or structure above, and then by sustaining such pressure until the Urethane solidifies, volume has been added back to the soil right where it may be required. Using high hydraulic pressure provided by an external pump and effecting a slow rate of delivery means that the degree of lift can be very accurately controlled and especially, over lifting can be avoided. We can stop at any given instant. If for example we are hoping to close some cracks, we can stop pumping as soon as they close.

This is therefore quite different to the case where rapidly expanding urethane is used and the pressure being generated predominantly from the chemically expanding urethane is used to effect any lifting. Once started chemical expansion will continue without any external means of slowing or stopping it.

This can result in excess lifting and is highly undesirable.

This present invention provides a systematic approach (critical path) that takes advantage of the natural and chemical/mechanical properties of clay and clay composite foundation soils.

The moisture content can be manipulated naturally, mechanically and/or chemically even artificially dried out. The 'Buffer Zone', stability in clay and clay composite soils is directly linked to the depth in the soil at which naturally, the moisture content remains constant (annually). The buffer zone can be manipulated naturally, mechanically and/or chemically.

The volume can be replaced mechanically and/or chemically. When clay and clay composite foundations soils moisture levels change from moderate to relatively low levels they can bear massive loads. The loss of moisture will have a corresponding ratio in loss of volume, under these circumstances a load will follow the soil down.

BRIEF DESCRIPTION OF THE DRAWINGS

For a better understanding of the invention it will now be described in detail with reference to embodiments which are described with the assistance of drawings wherein.

DESCRIPTION OF THE EMBODIMENTS

Figure 1:
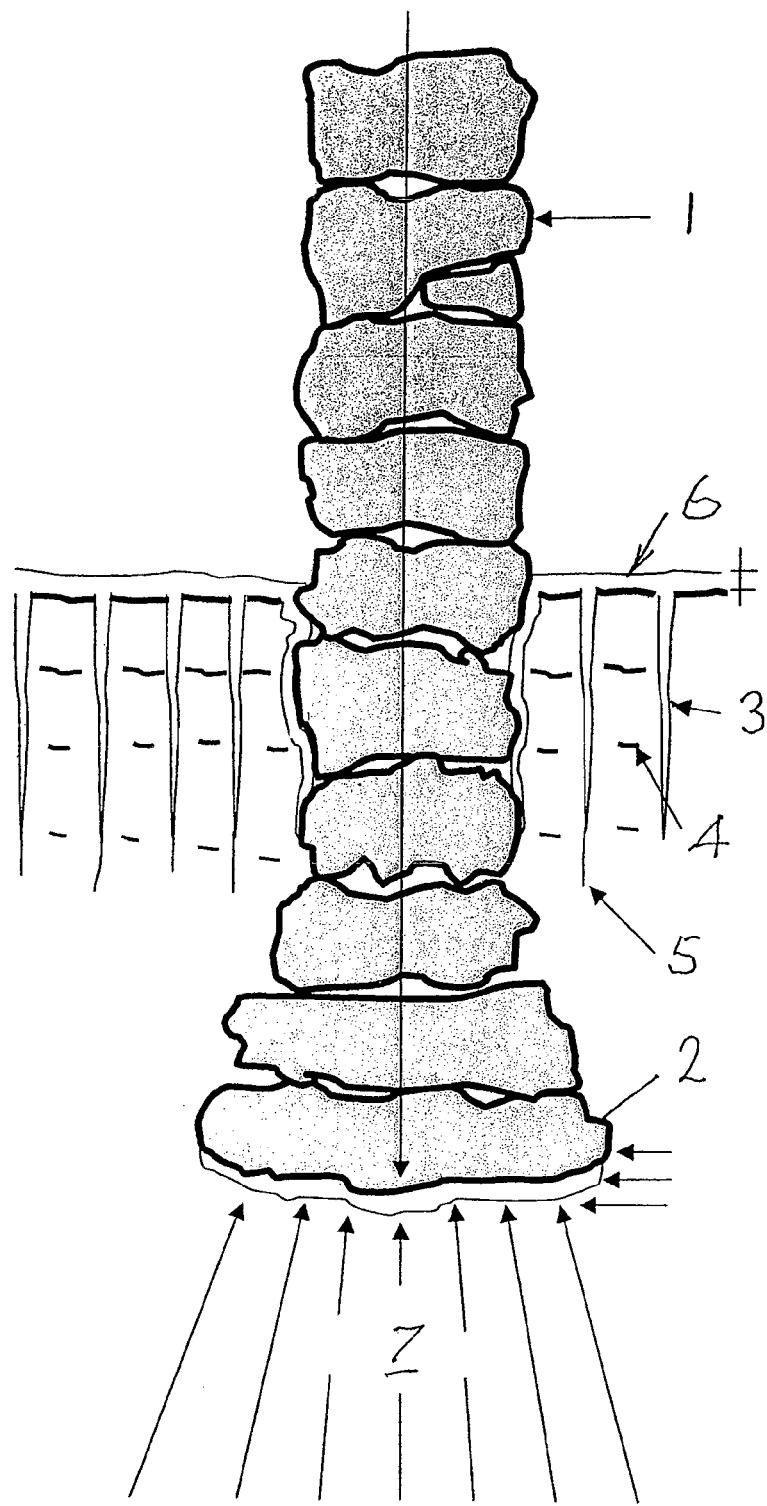
FIG. 1 shows in schematic cross section a stone wall with stone footing as it might be after construction with low reactivity clay/clay composite soil showing both vertical cracks in the soil and horizontal fractures as at the end of a summer season.
Figure 2:
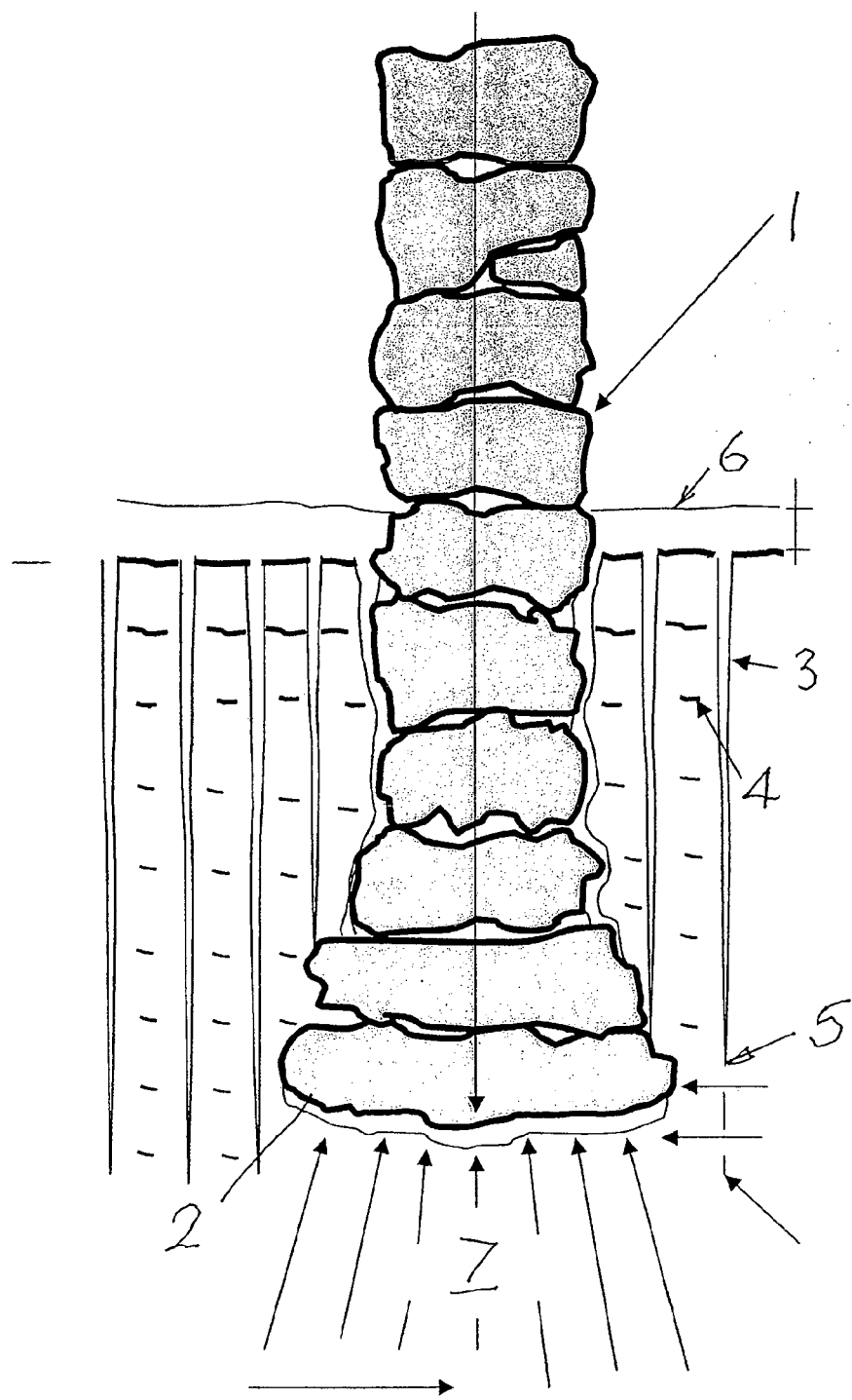
FIG. 2 is the same view as in FIG. 1 showing however the effects when the soils are a high reactivity clay/clay composite soil showing the much deeper vertical cracks and an unstable foundation soil.

In FIGS. 1 through to 6 and the same steps are repeated for subsequent examples in FIGS. 7-12, 13-18 and 19-24 where the footings and wall structures are simply changed there is a for FIGS. 1-6 specifically a stone wall 1 with a footing 2. The vertical cracks 3 are shown with occasional horizontal fractures 4 and having an average depth as shown at 5.

The amount of soil heave is shown typically at 6. An extent of stable or unstable support for a footing provided by the soil is shown at 7.

Figure 3:
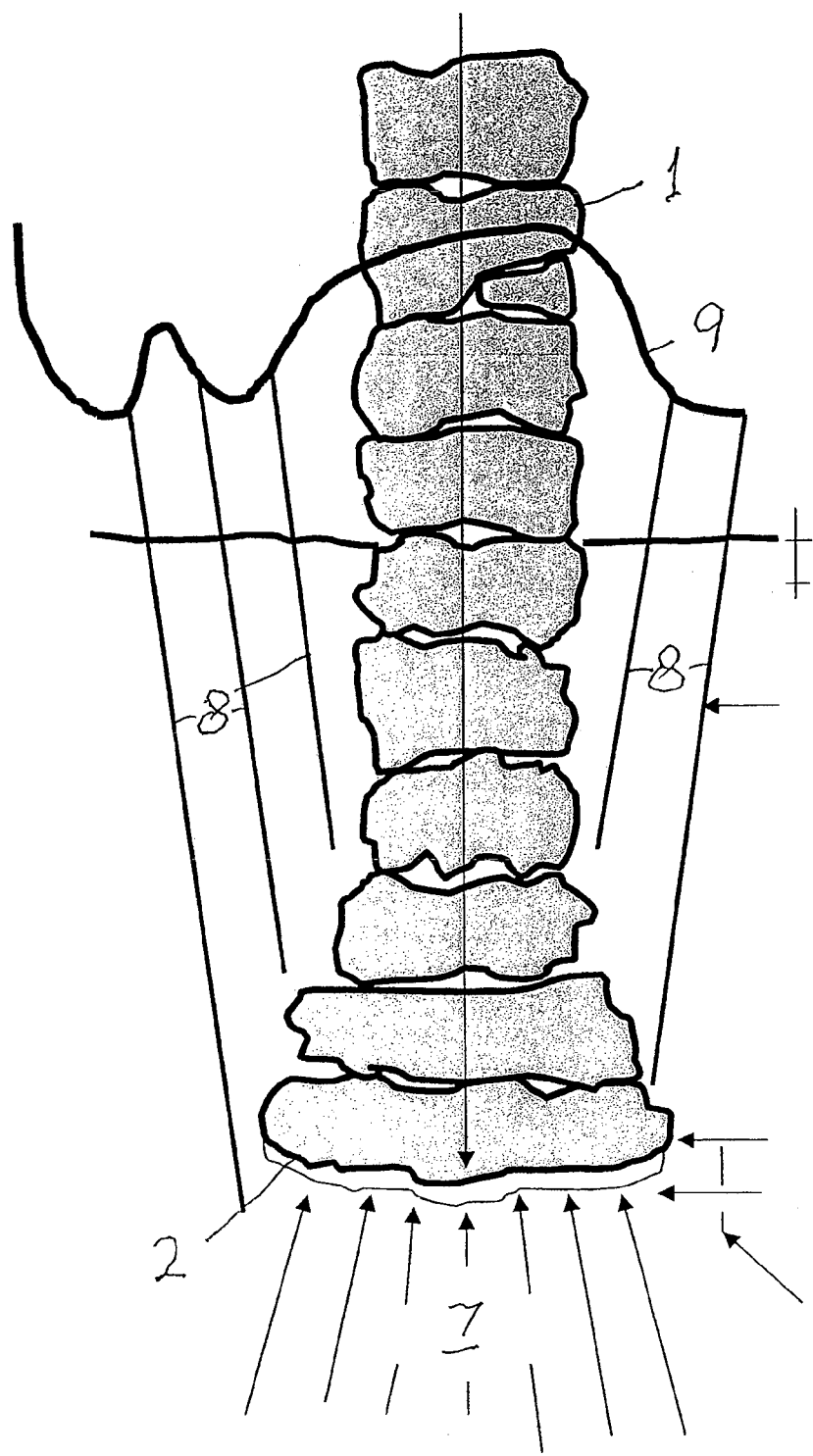
FIG. 3 shows the next step where a drying step is used, with a number of tubes inserted into the area around the footing with compressed air being driven through these to dry the soil out.

In FIG. 3 compressed air hollow rods 8 are shown connected to a common air supply pipe 9.

Figure 4:
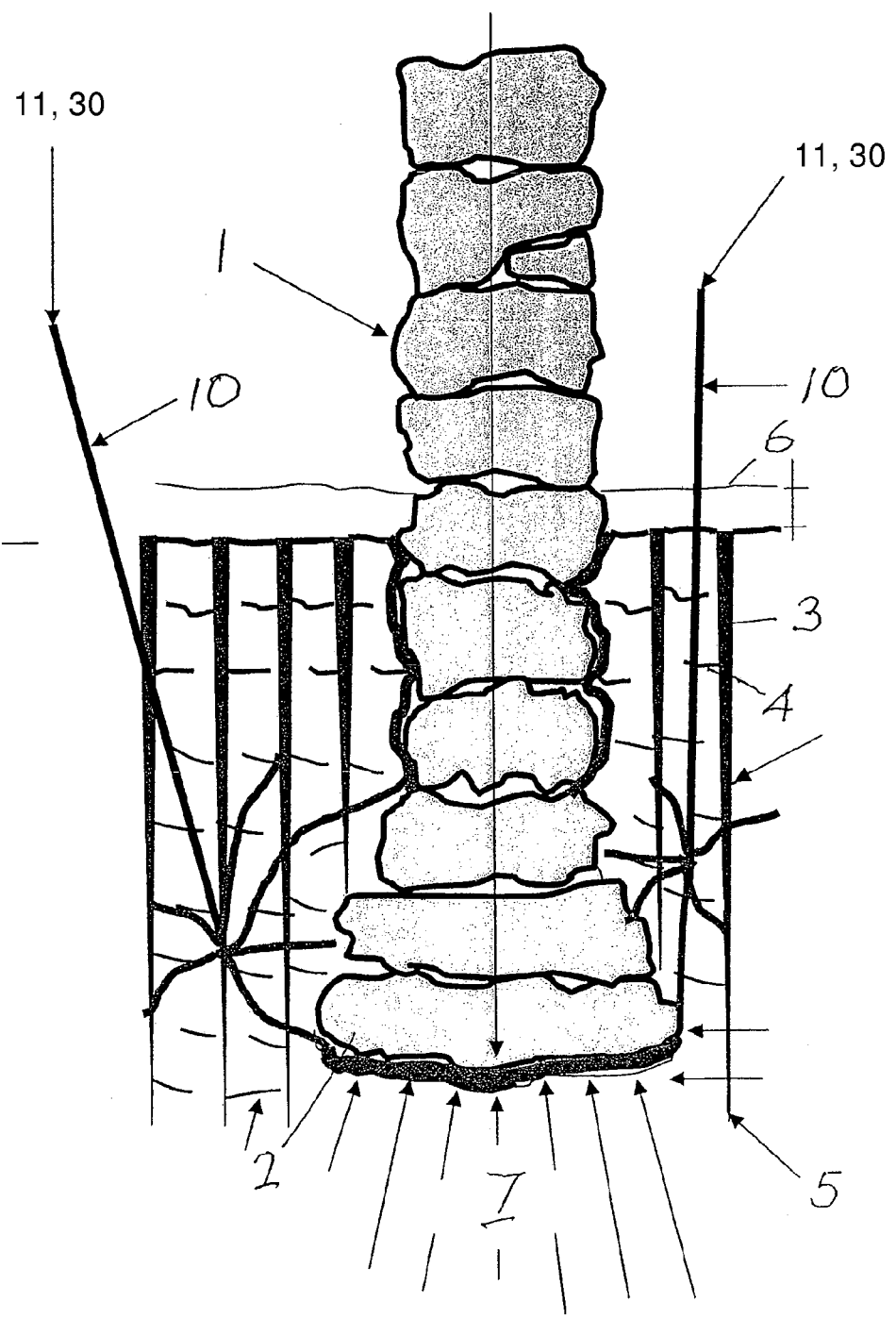
FIG. 4 shows the next step for high reactivity clay/clay composite soils which involves pumping low viscosity and slow setting urethane under very high pressure through reactor rods that have their outlets around the footing to fill up the gaps.

In FIG. 4 reactor rods 10 are supplied through a one-way valve 11 with a slowly setting precatalyzed urethane monomer which is intended to be inserted outside of the footing so as to block escape subsequently of the lifting material.

Figure 5:
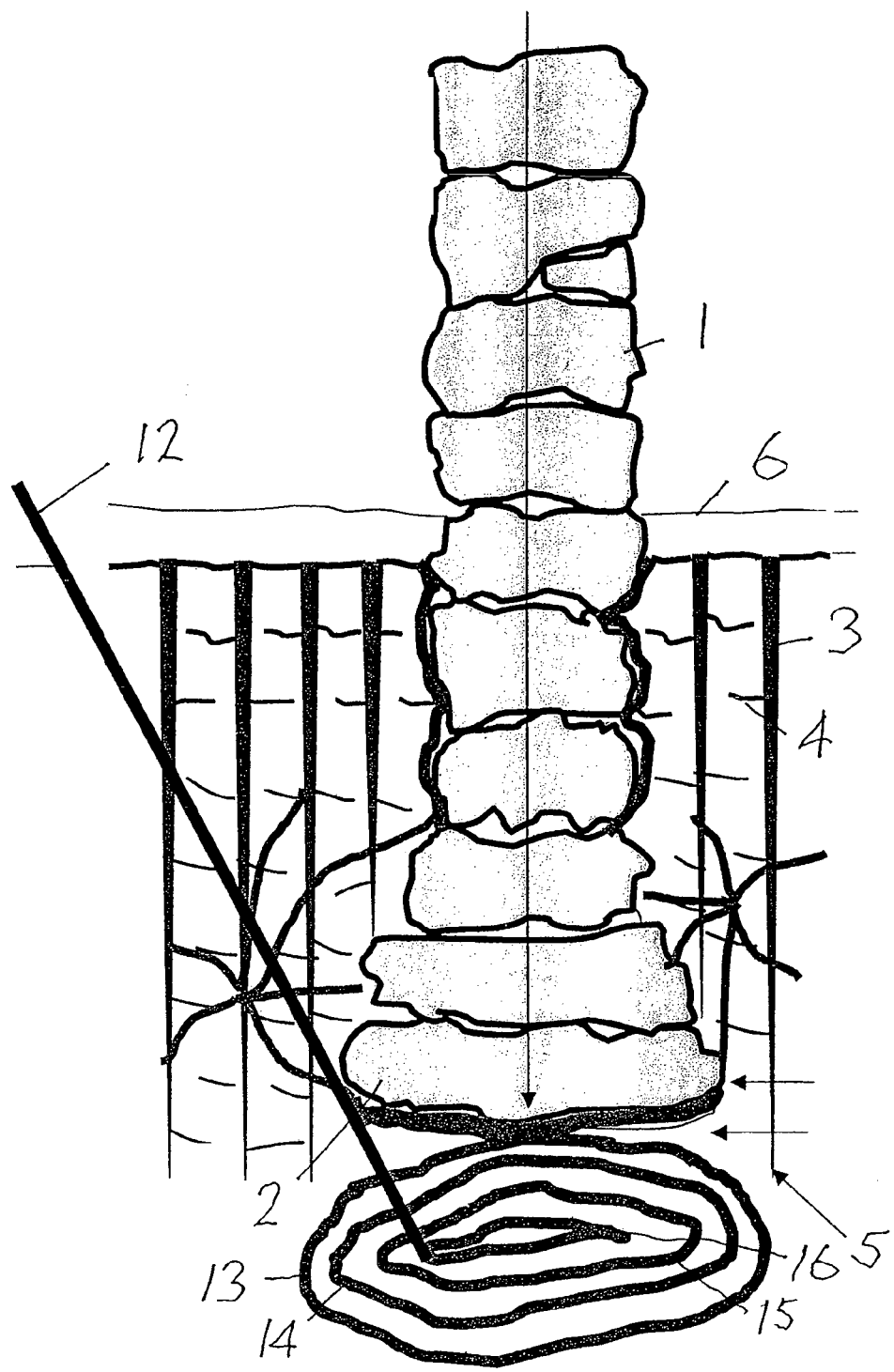
FIG. 5 shows the next step for high reactivity clay/clay composite soils where a reactor rod now has its outlet beneath the footing and a low viscosity slightly foaming urethane is pumped under very high pressure beneath the footing. This is now monitored by observation of the lift in the wall (crack size and alignment are good indicators) and the pumping is repeated now with the reactor rod in the same place until a desired lift of the wall is achieved.

In FIG. 5 reactor rod 12 is inserted with effort to have its outlet beneath the footing 2 and so that it will enable successive insertions of low viscosity foaming precatalyzed urethane monomer into the area beneath the footing 2. This will result is successive balloons 13, 14, 15 and 16 one entering the other to enlarge the outer one each time and thereby provide a controlled lifting effect almost exclusively to the footing 2 and the wall 1. This can be repeated any number of times to achieve a desired lift extent.

Figure 6:
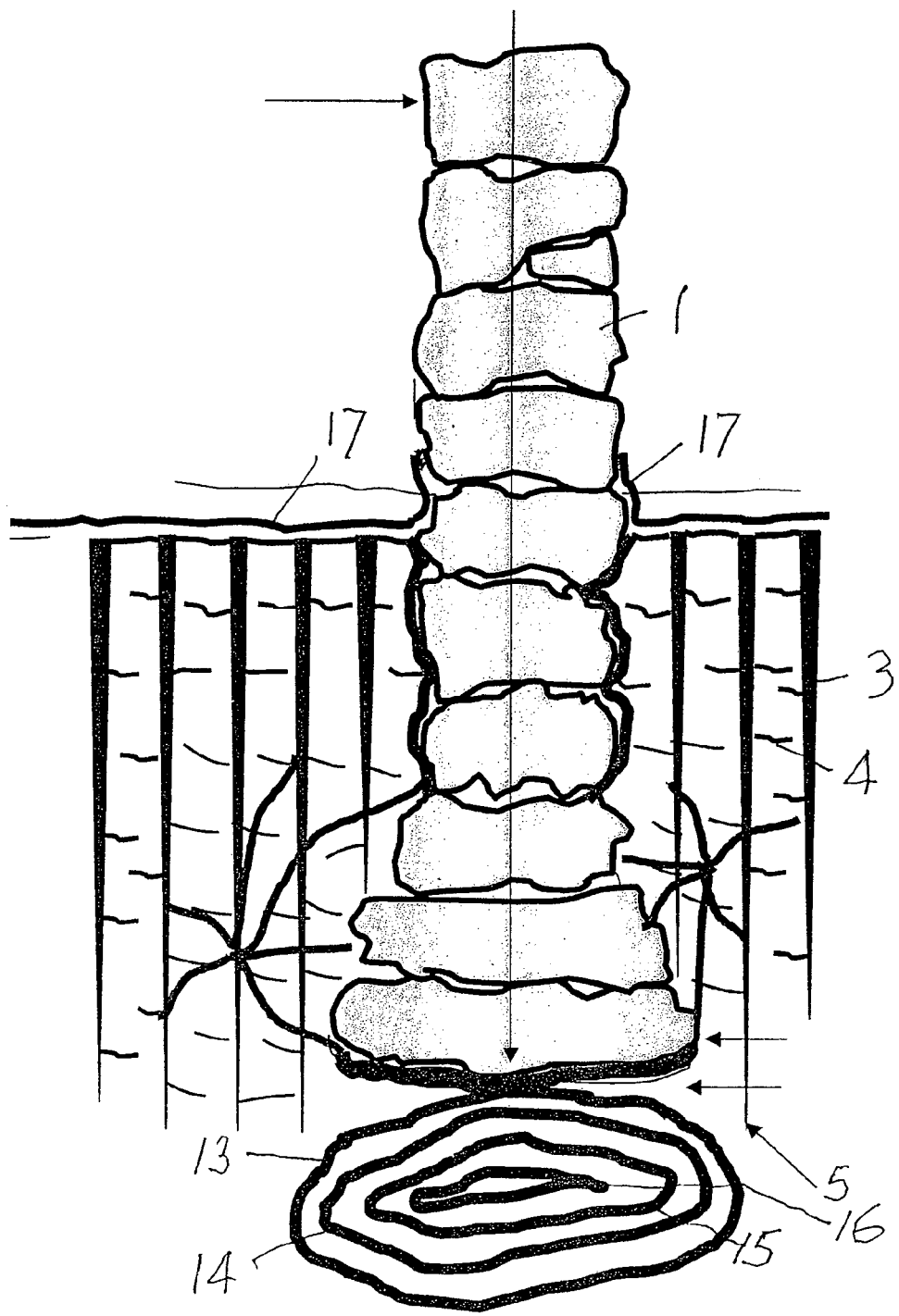
FIG. 6 shows a next step where a water impervious layer is laid across an upper surface of the soil to protect this for the future.
Figure 7:
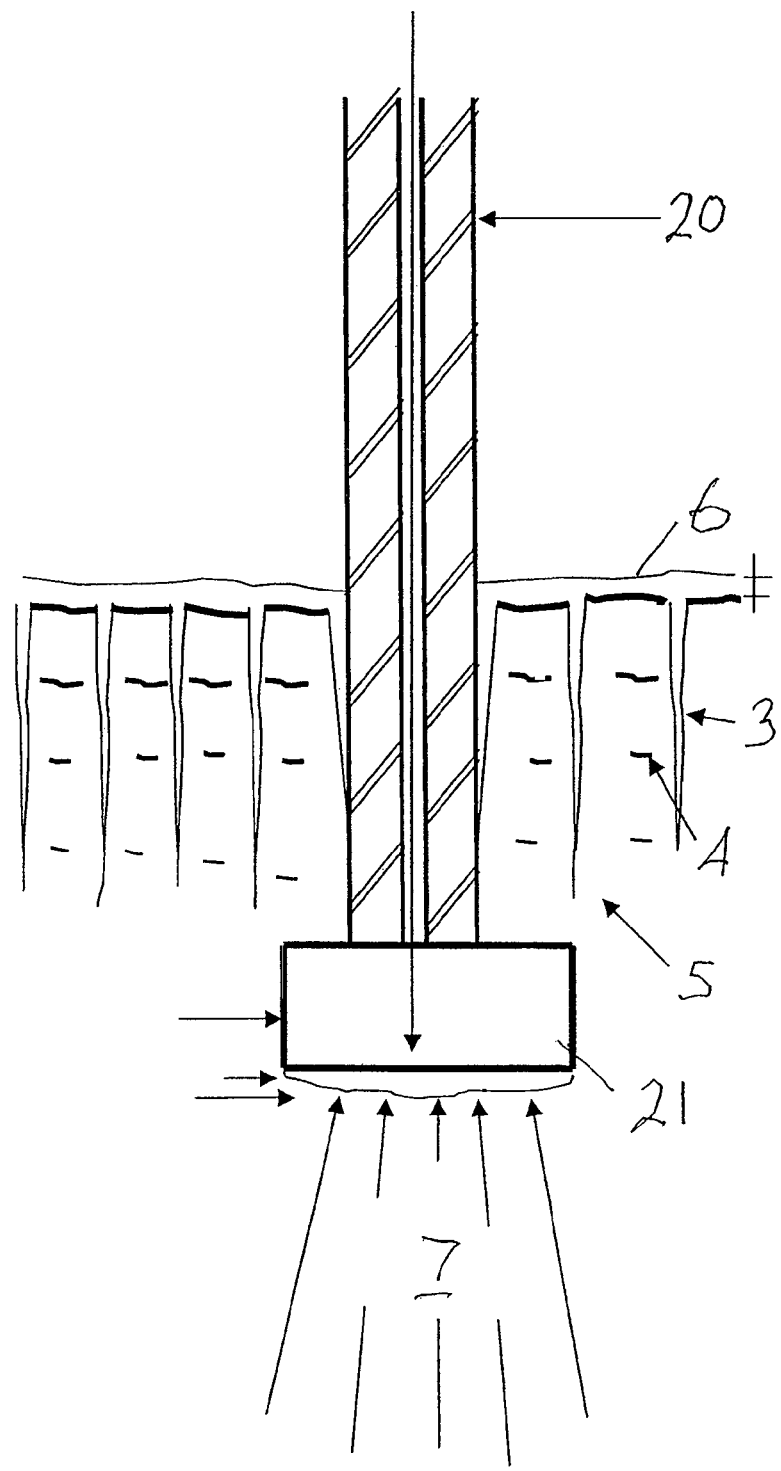
FIG. 7 shows in schematic cross section a masonry wall with wide footing as it might be after construction with low reactivity clay/clay composite soil showing both vertical cracks in the soil and horizontal fractures as at the end of a summer season.
Figure 8:
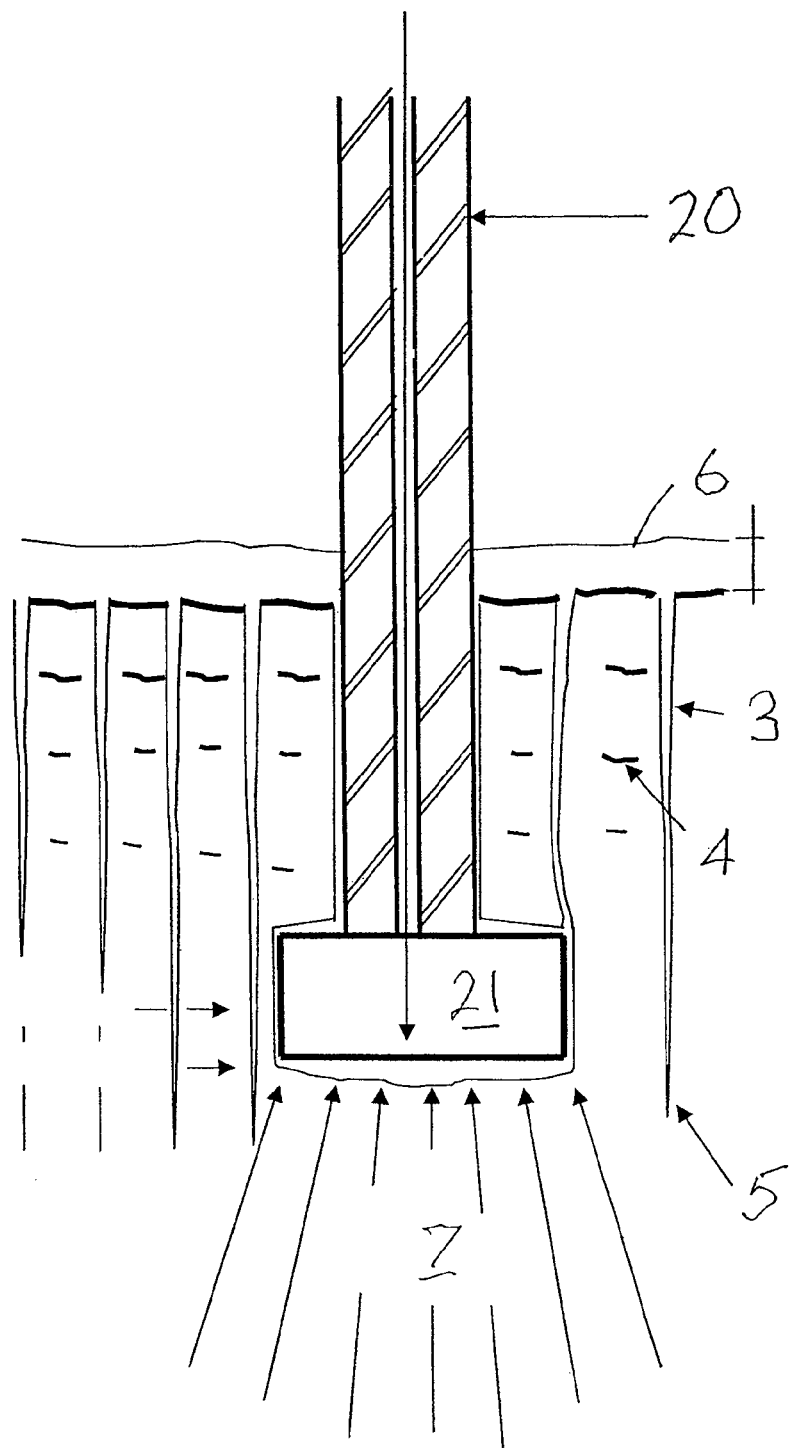
FIG. 8 is the same view as in FIG. 7 showing however the effects when the soils are a high reactivity clay/clay composite soil showing the much deeper vertical cracks and an unstable foundation soil.
Figure 9:
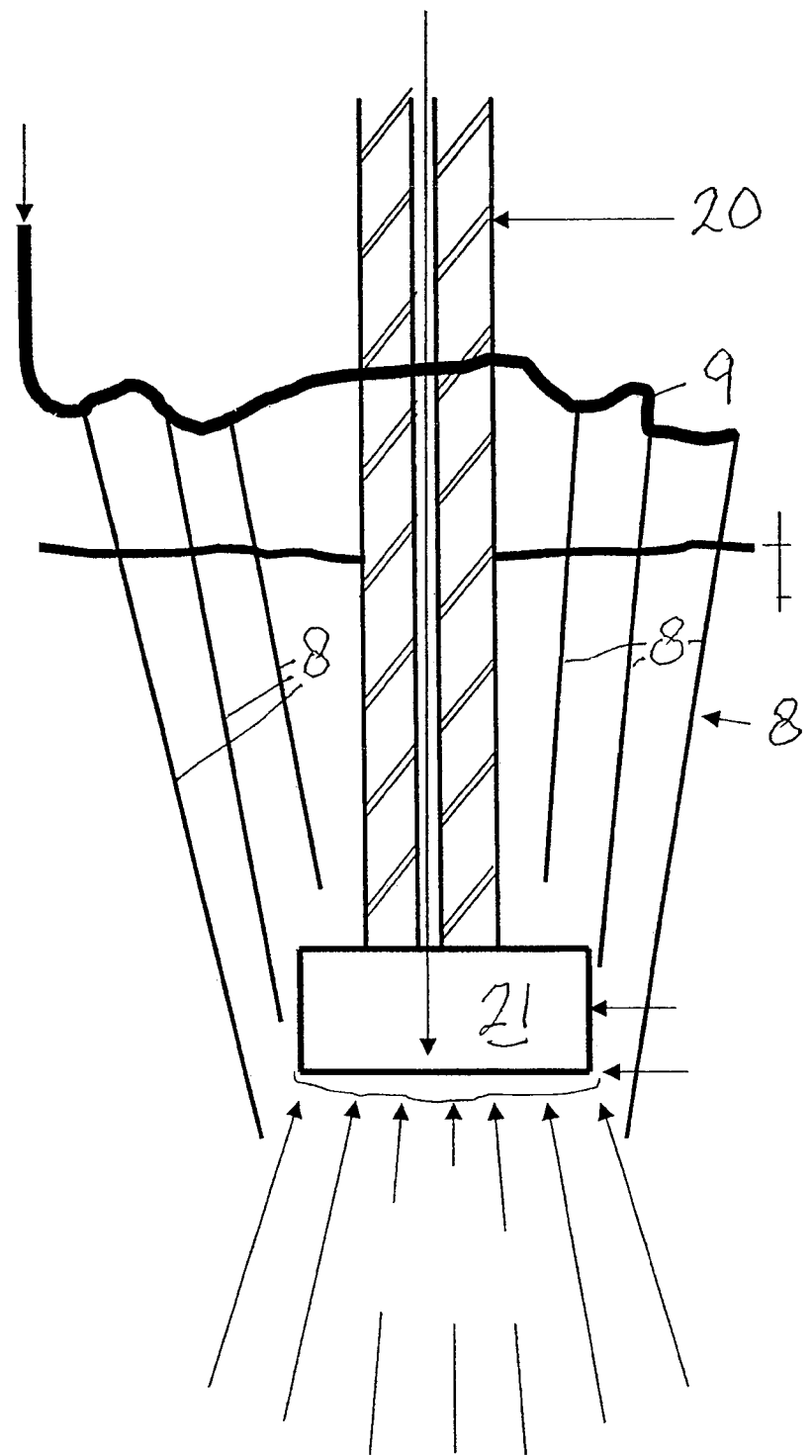
FIG. 9 shows the next step where a drying step is used, with a number of tubes inserted into the area around the footing with compressed air being driven through these to dry the soil out.
Figure 10:
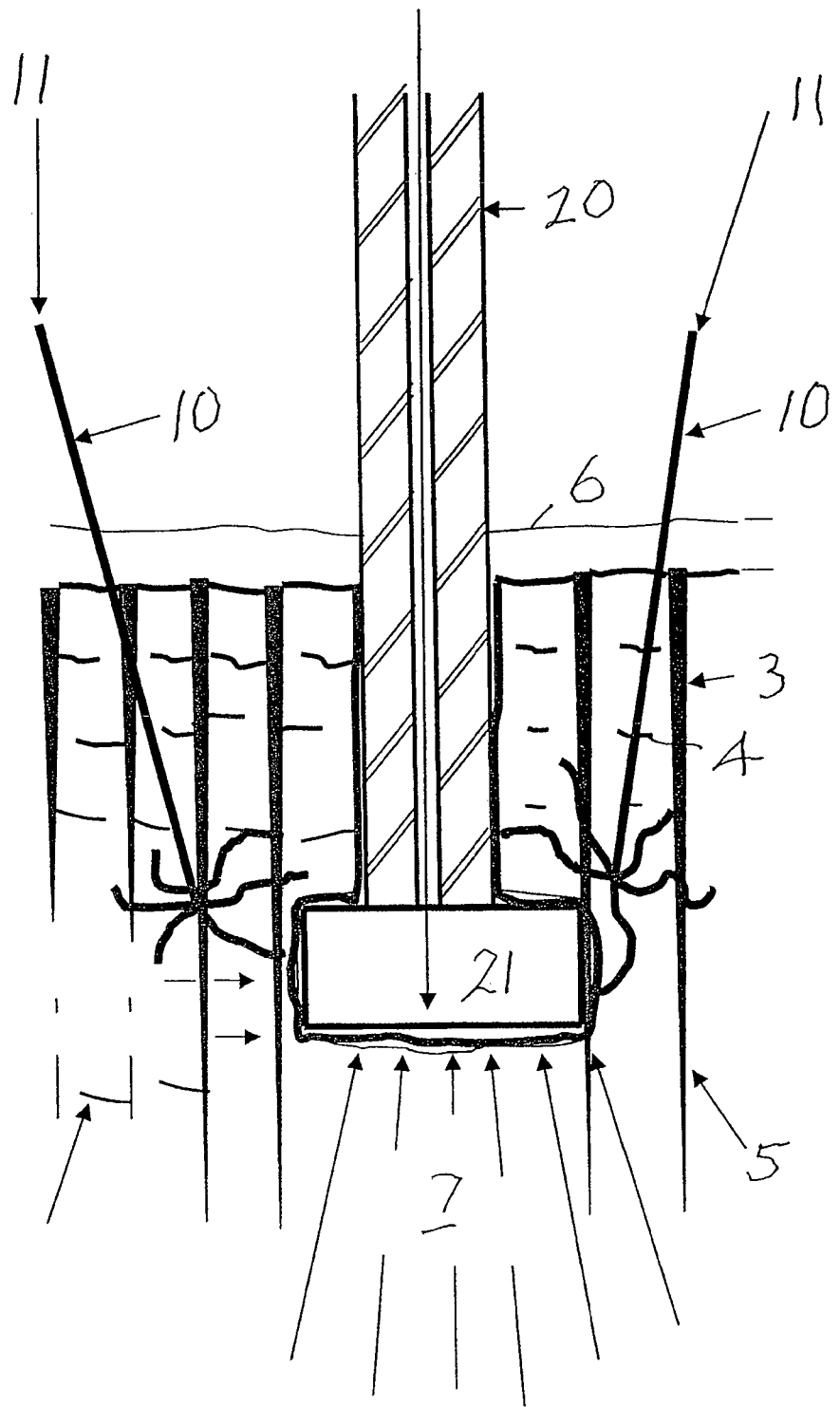
FIG. 10 shows the next step for high reactivity clay/clay composite soils which involves pumping low viscosity and slow setting urethane under very high pressure through reactor rods that have their outlets around the footing to fill up the gaps.
Figure 11:
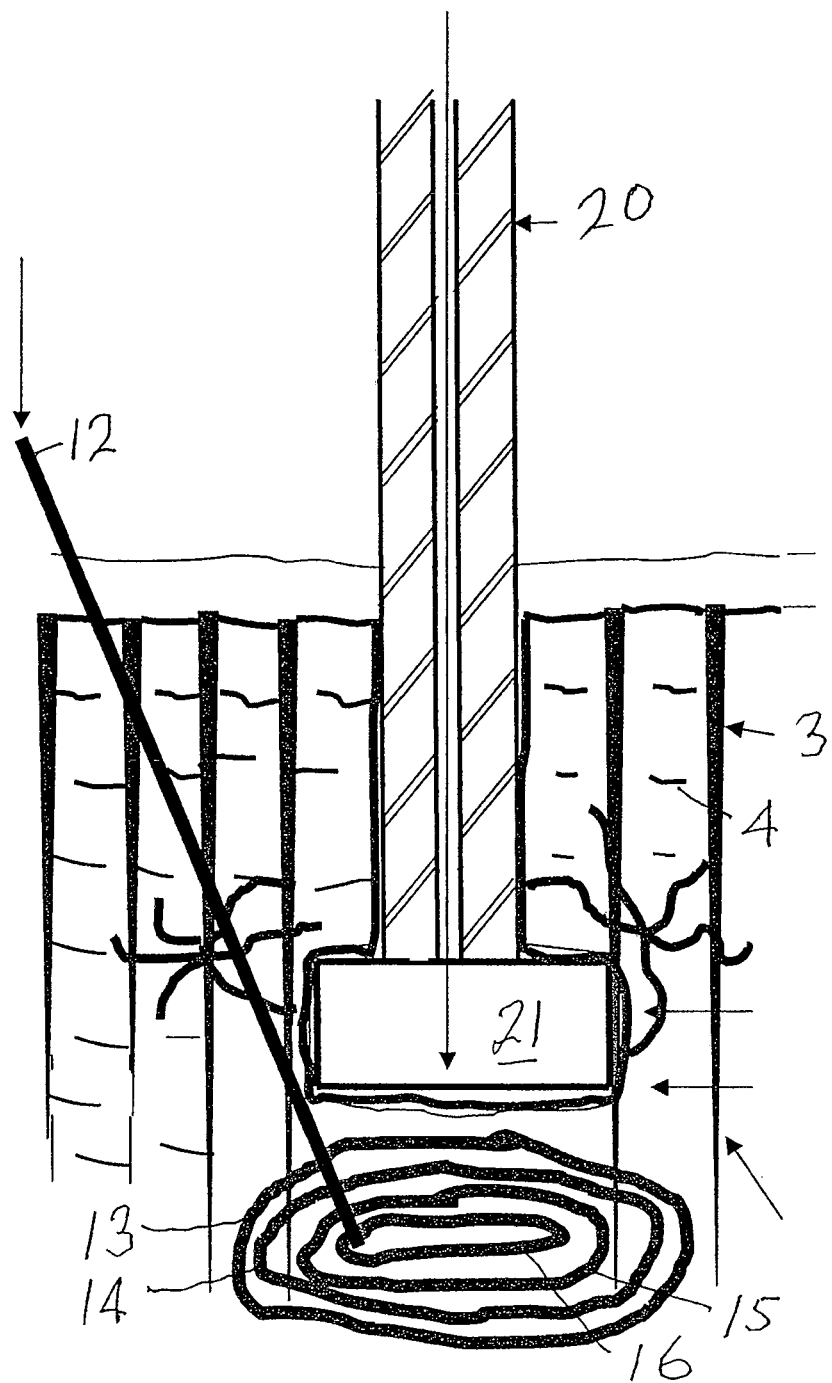
FIG. 11 shows the next step for high reactivity clay/clay composite soils where a reactor rod now has its outlet beneath the footing and a low viscosity slightly foaming urethane is pumped under very high pressure beneath the footing. This is now monitored by observation of the lift in the wall (crack size and alignment are good indicators) and the pumping is repeated now with the reactor rod in the same place until a desired lift of the wall is achieved.
Figure 12:
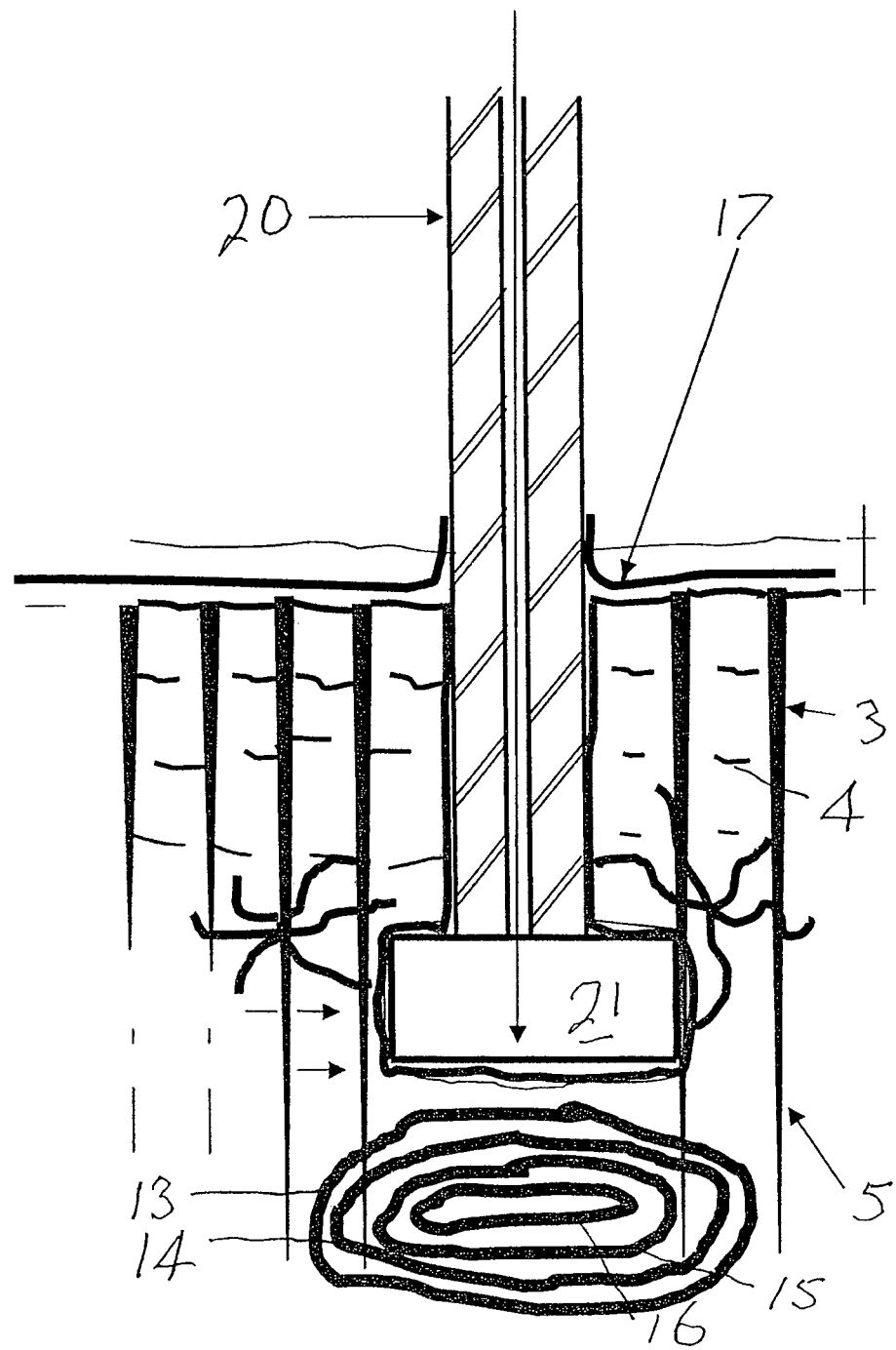
FIG. 12 shows a next step where a water impervious layer is laid across an upper surface of the soil to protect this for the future.
Figure 13:
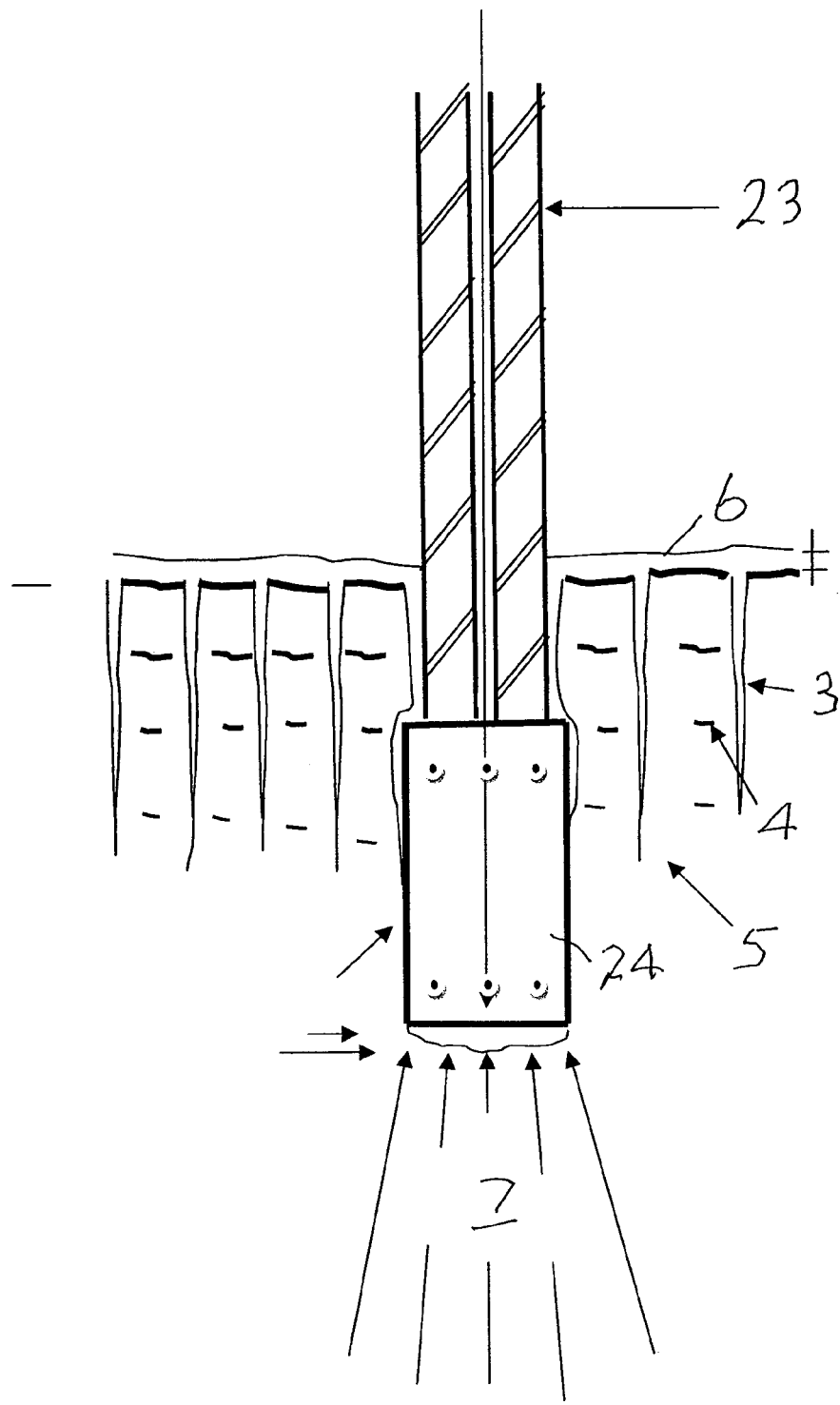
FIG. 13 shows in schematic cross section a masonry reinforced wall with a concrete reinforced footing as it might be after construction with low reactivity clay/clay composite soil showing both vertical cracks in the soil and horizontal fractures as at the end of a summer season.
Figure 14:
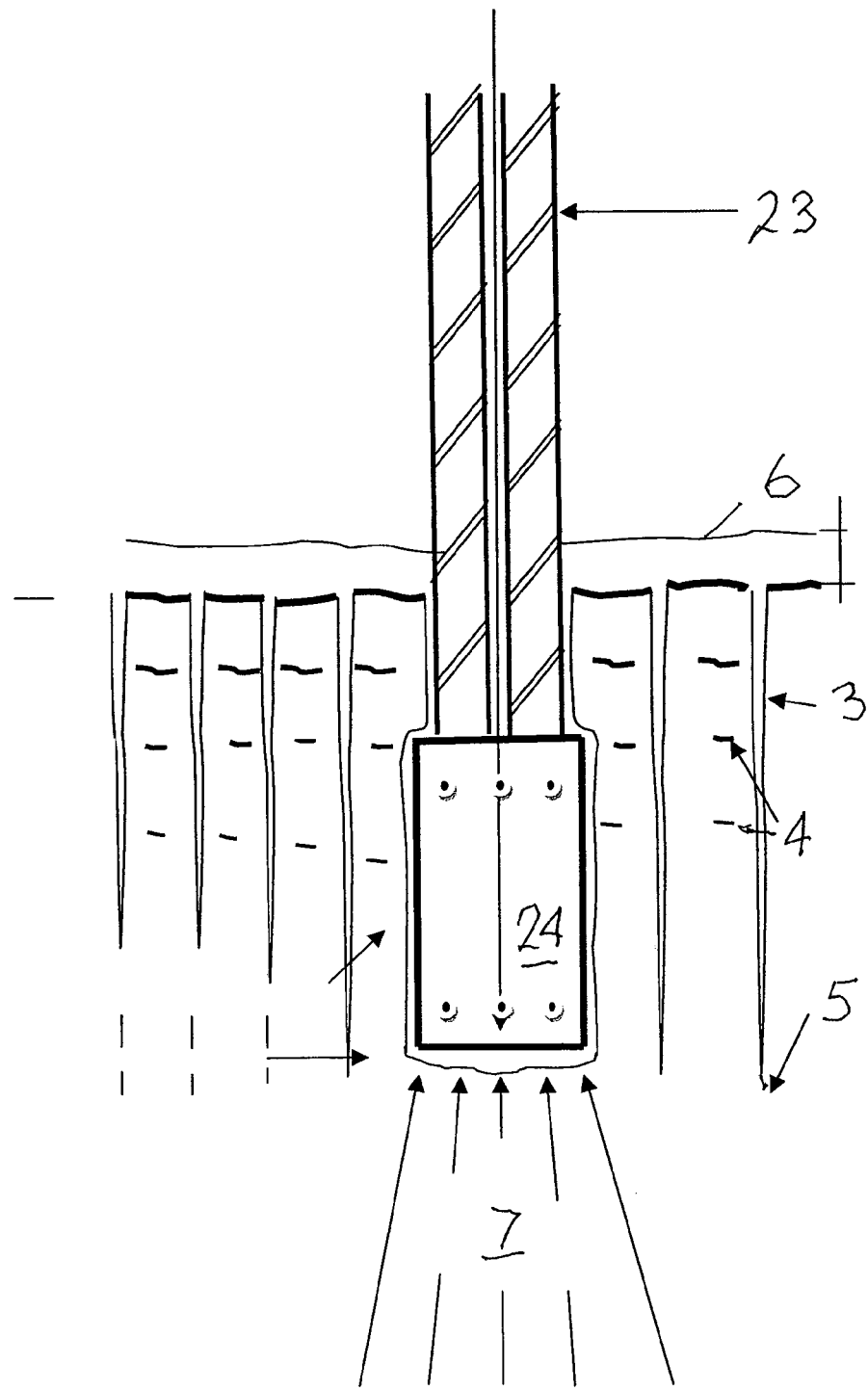
FIG. 14 is the same view as in FIG. 13 showing however the effects when the soils are a high reactivity clay/clay composite soil showing the much deeper vertical cracks and an unstable foundation soil.
Figure 15:
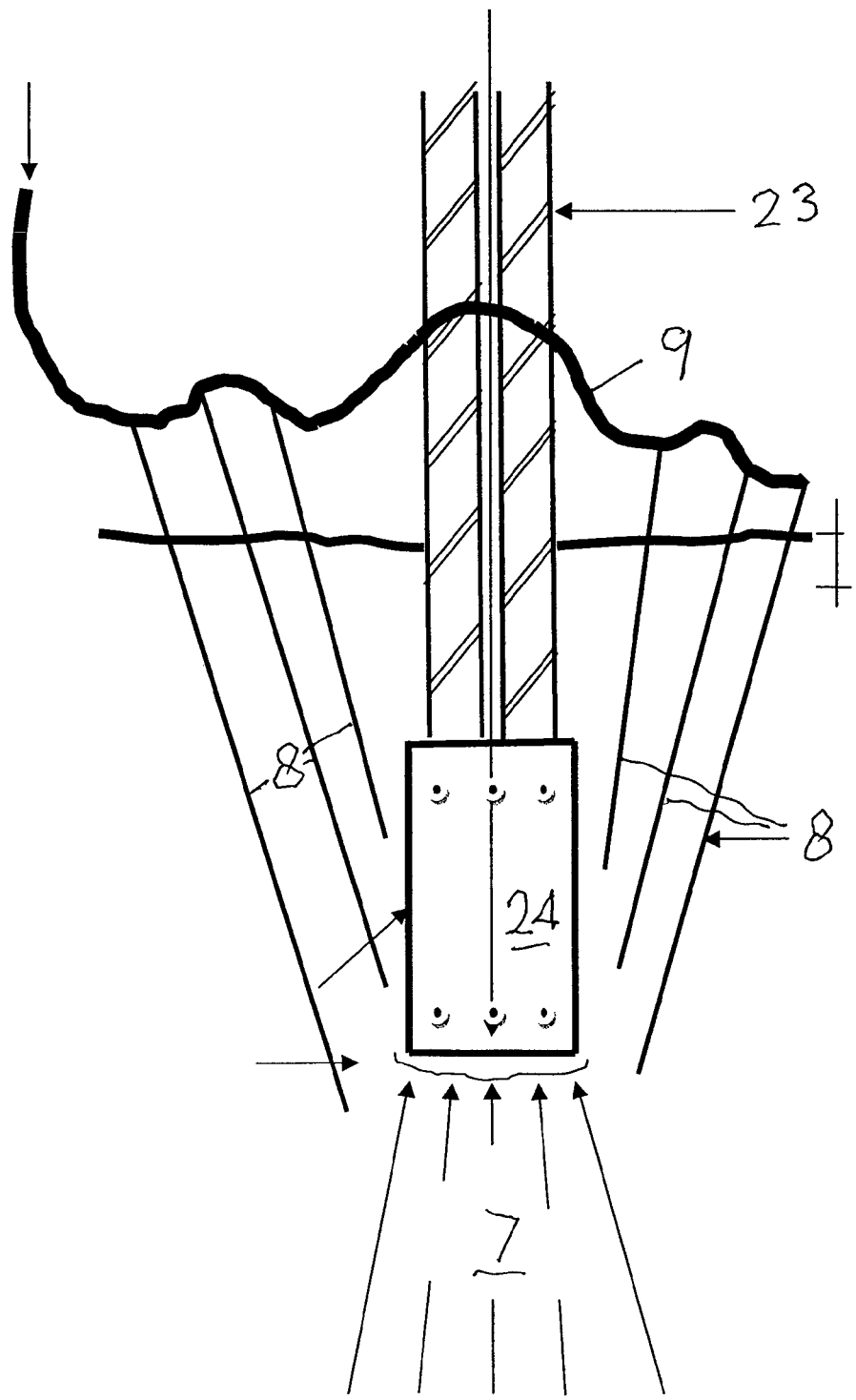
FIG. 15 shows the next step where a drying step is used, with a number of tubes inserted into the area around the footing with compressed air being driven through these to dry the soil out.
Figure 16:
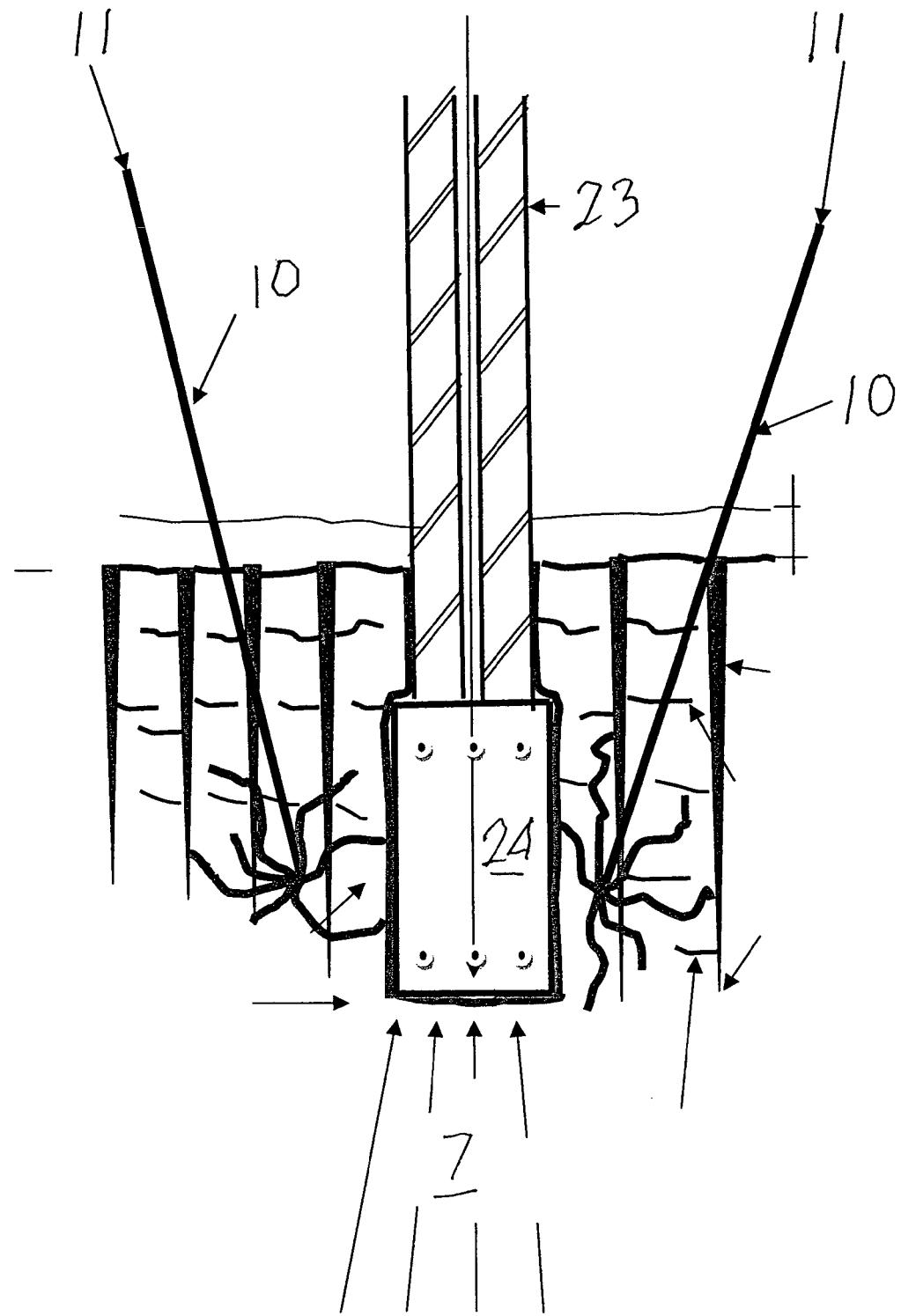
FIG. 16 shows the next step for high reactivity clay/clay composite soils which involves pumping low viscosity and slow setting urethane under very high pressure through reactor rods that have their outlets around the footing to fill up the gaps.
Figure 17:
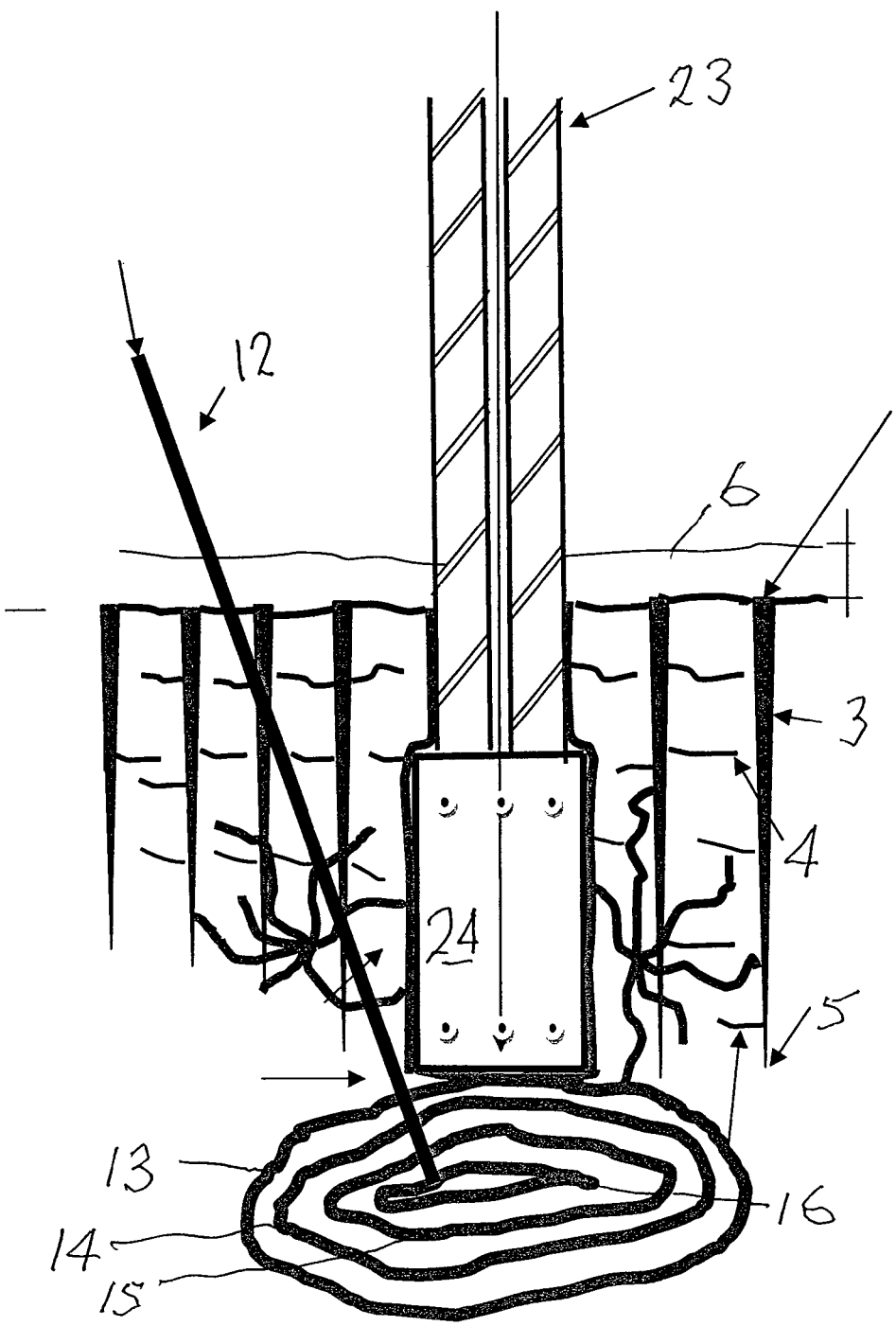
FIG. 17 shows the next step for high reactivity clay/clay composite soils where a reactor rod now has its outlet beneath the footing and a low viscosity slightly foaming urethane is pumped under very high pressure beneath the footing. This is now monitored by observation of the lift in the wall (crack size and alignment are good indicators) and the pumping is repeated now with the reactor rod in the same place until a desired lift of the wall is achieved.
Figure 18:
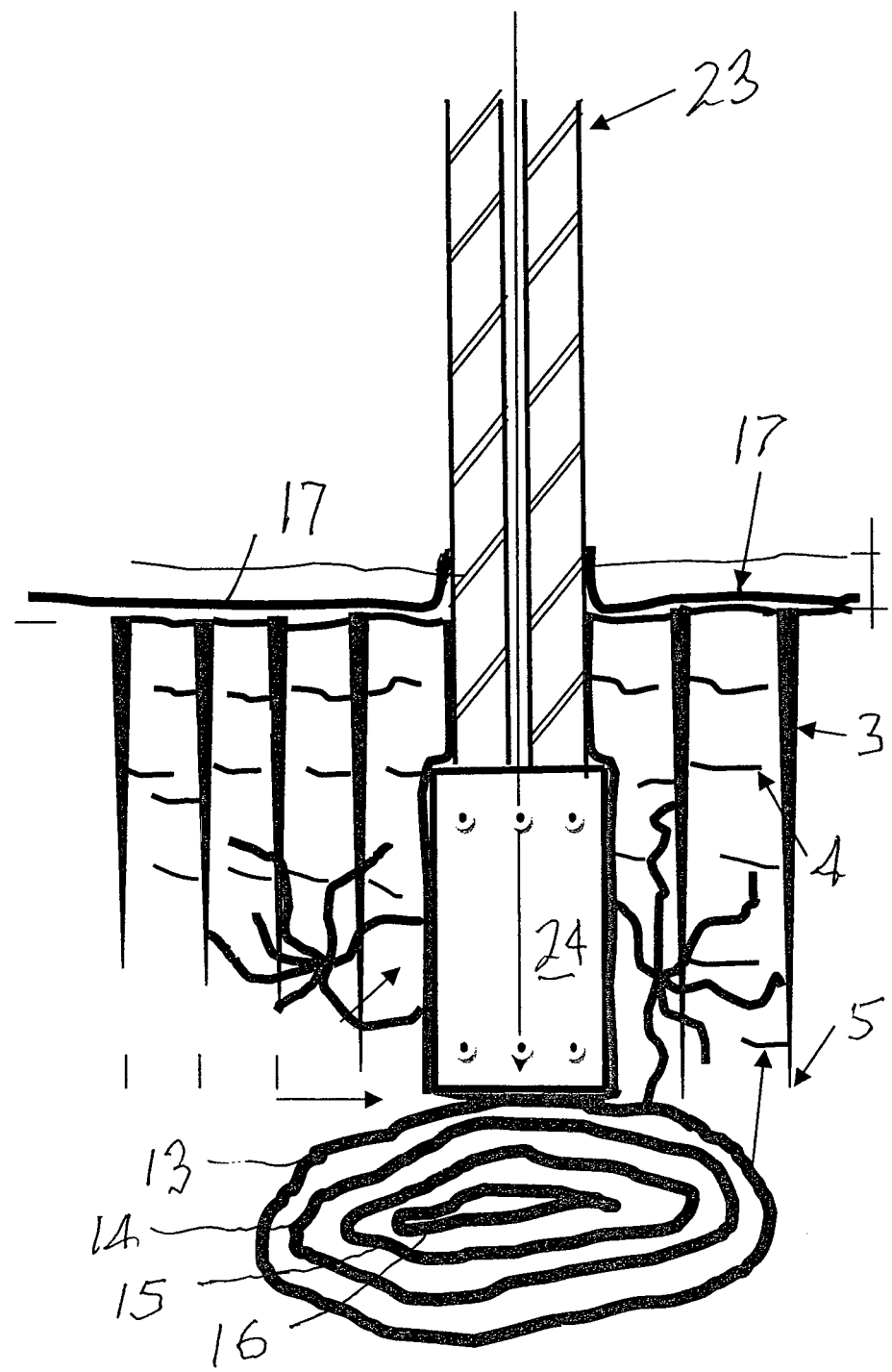
FIG. 18 shows a next step where a water impervious layer is laid across an upper surface of the soil to protect this for the future.
Figure 19:
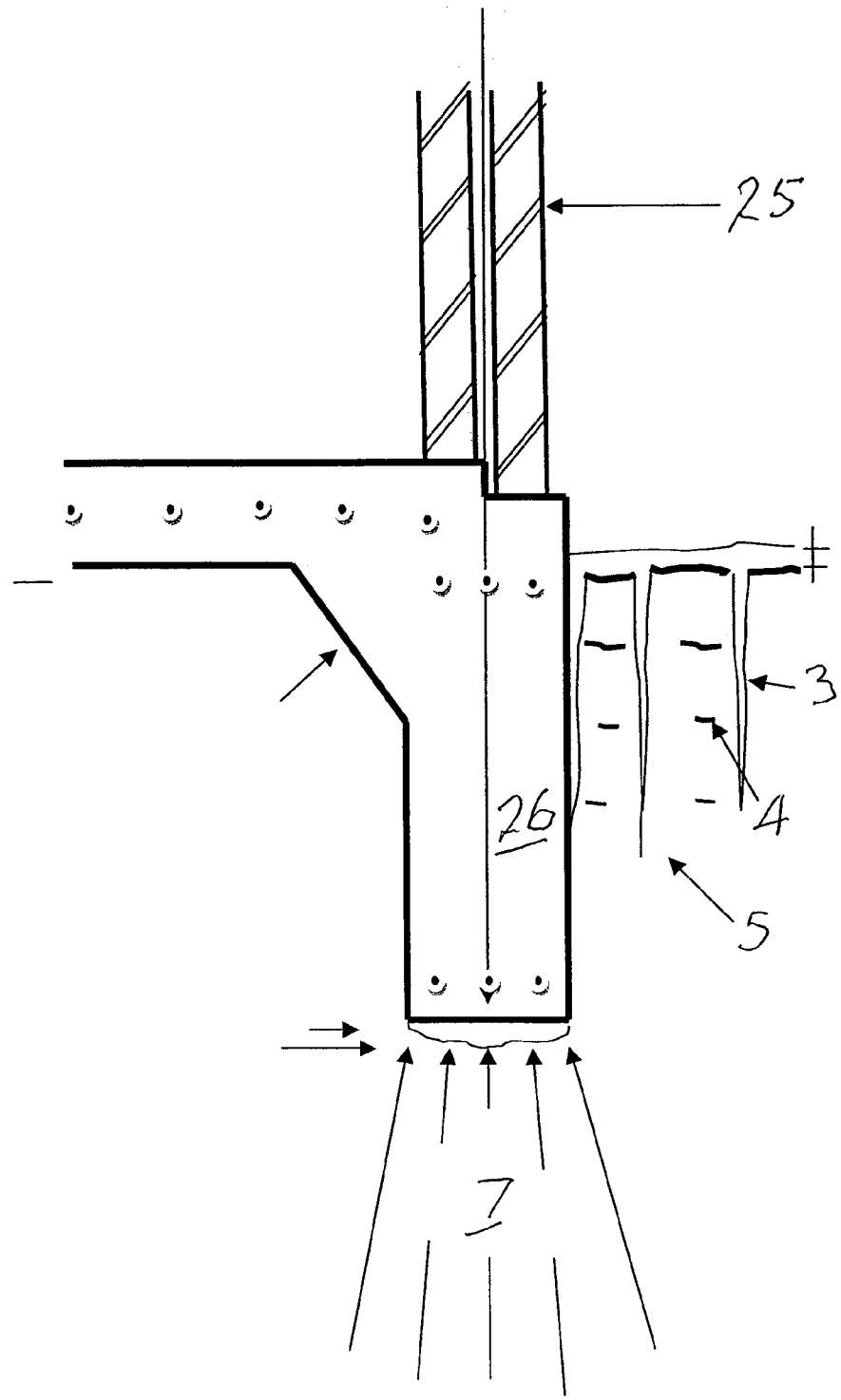
FIG. 19 shows in schematic cross section a raft foundation with a curtain footing as it might be after construction with low reactivity clay/clay composite soil showing both vertical cracks in the soil and horizontal fractures as at the end of a summer season.
Figure 20:
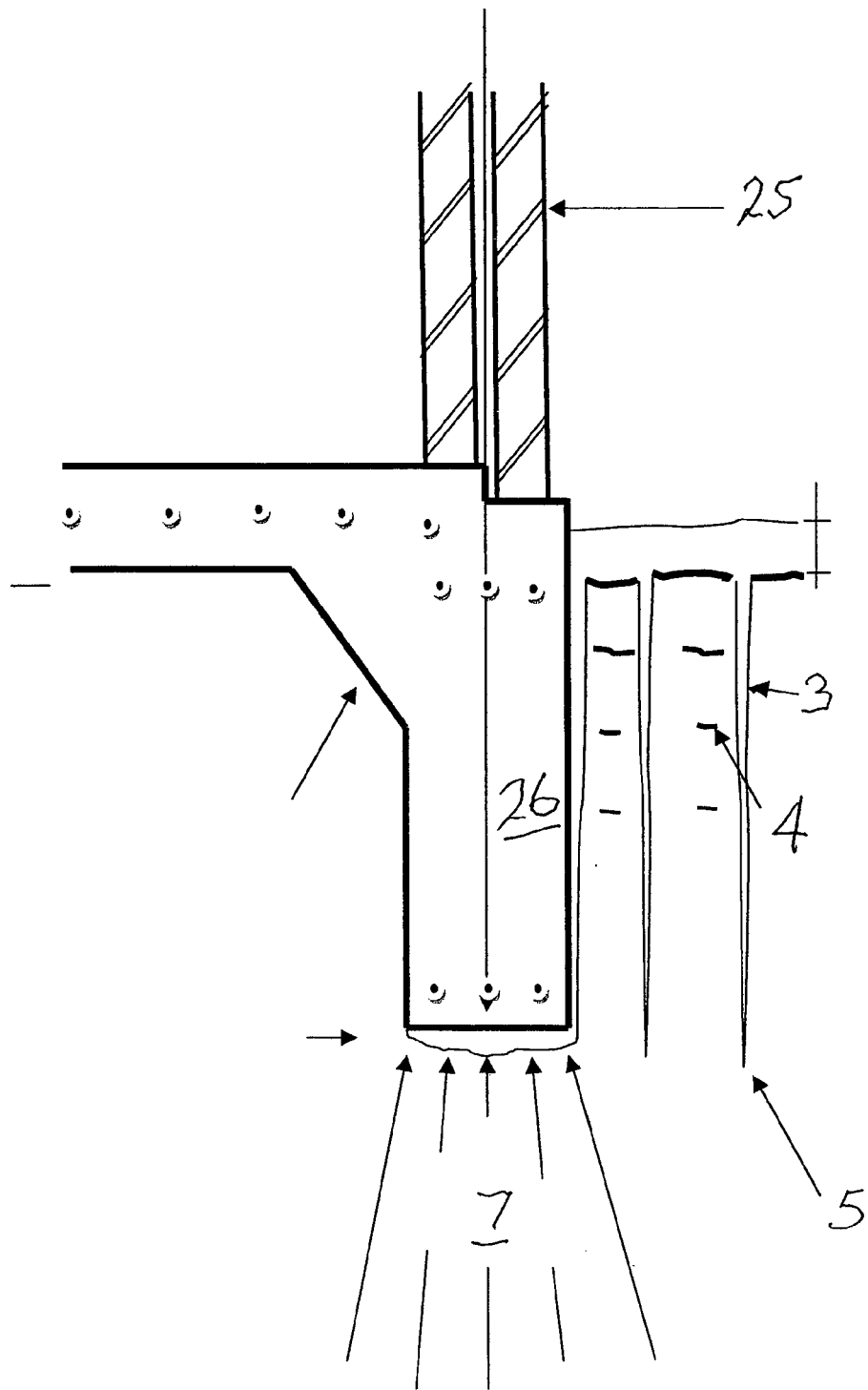
FIG. 20 is the same view as in FIG. 1 showing however the effects when the soils are a high reactivity clay/clay composite soil showing the much deeper vertical cracks and an unstable foundation soil.
Figure 21:
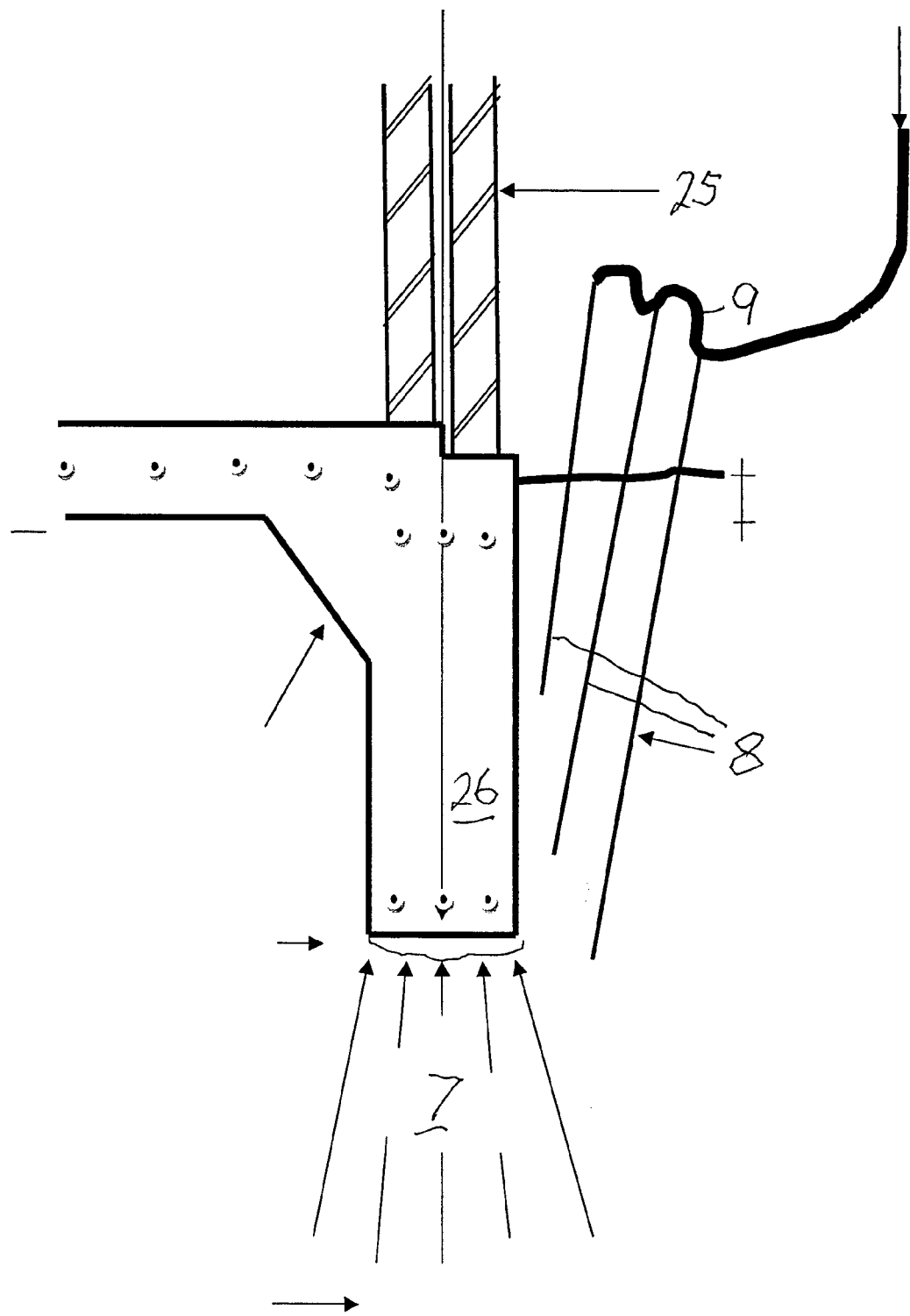
FIG. 21 shows the next step where a drying step is used, with a number of tubes inserted into the area around the footing with compressed air being driven through these to dry the soil out.
Figure 22:
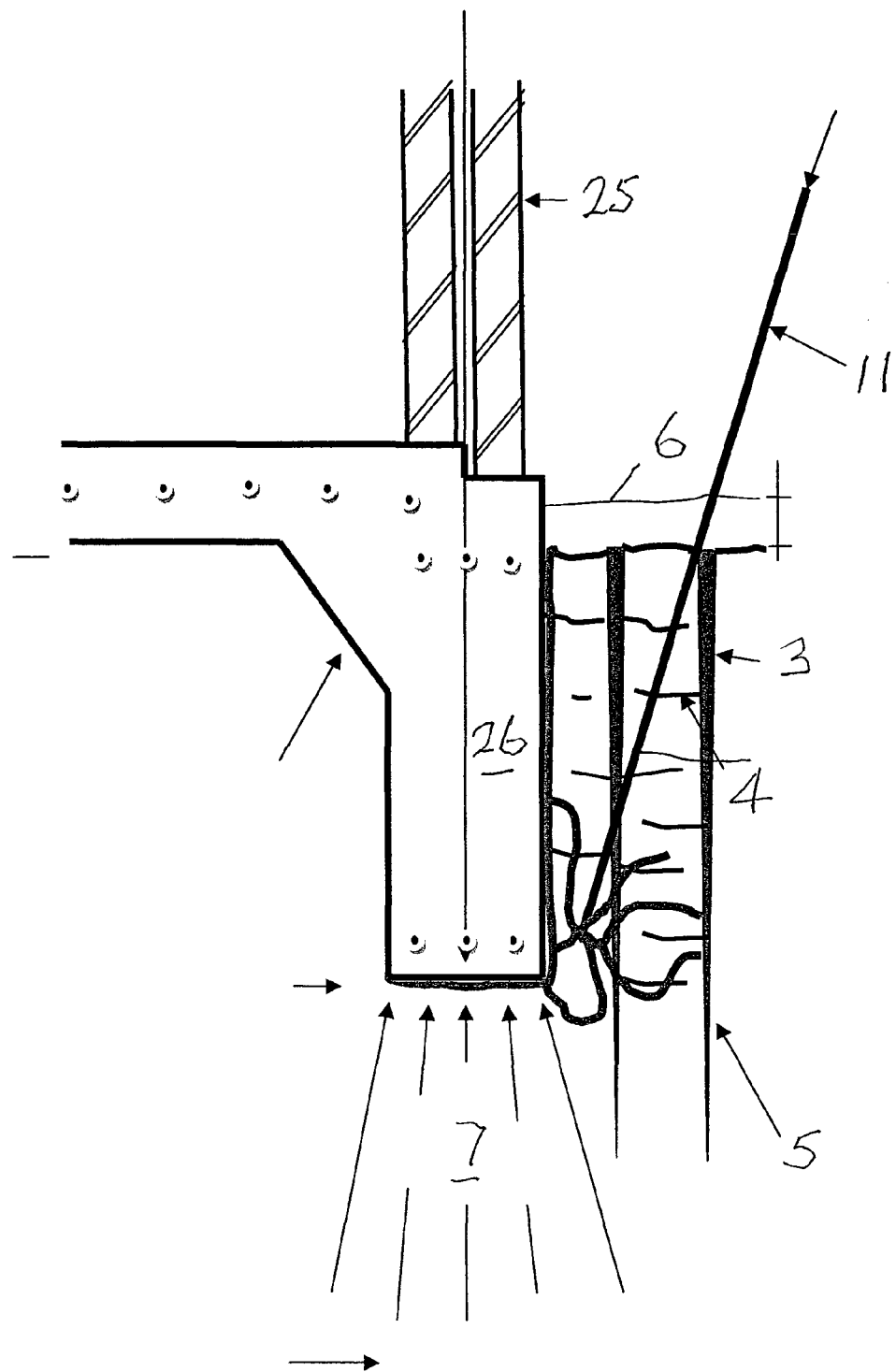
FIG. 22 shows the next step for high reactivity clay/clay composite soils which involves pumping low viscosity and slow setting urethane under very high pressure through reactor rods that have their outlets around the footing to fill up the gaps.
Figure 23:
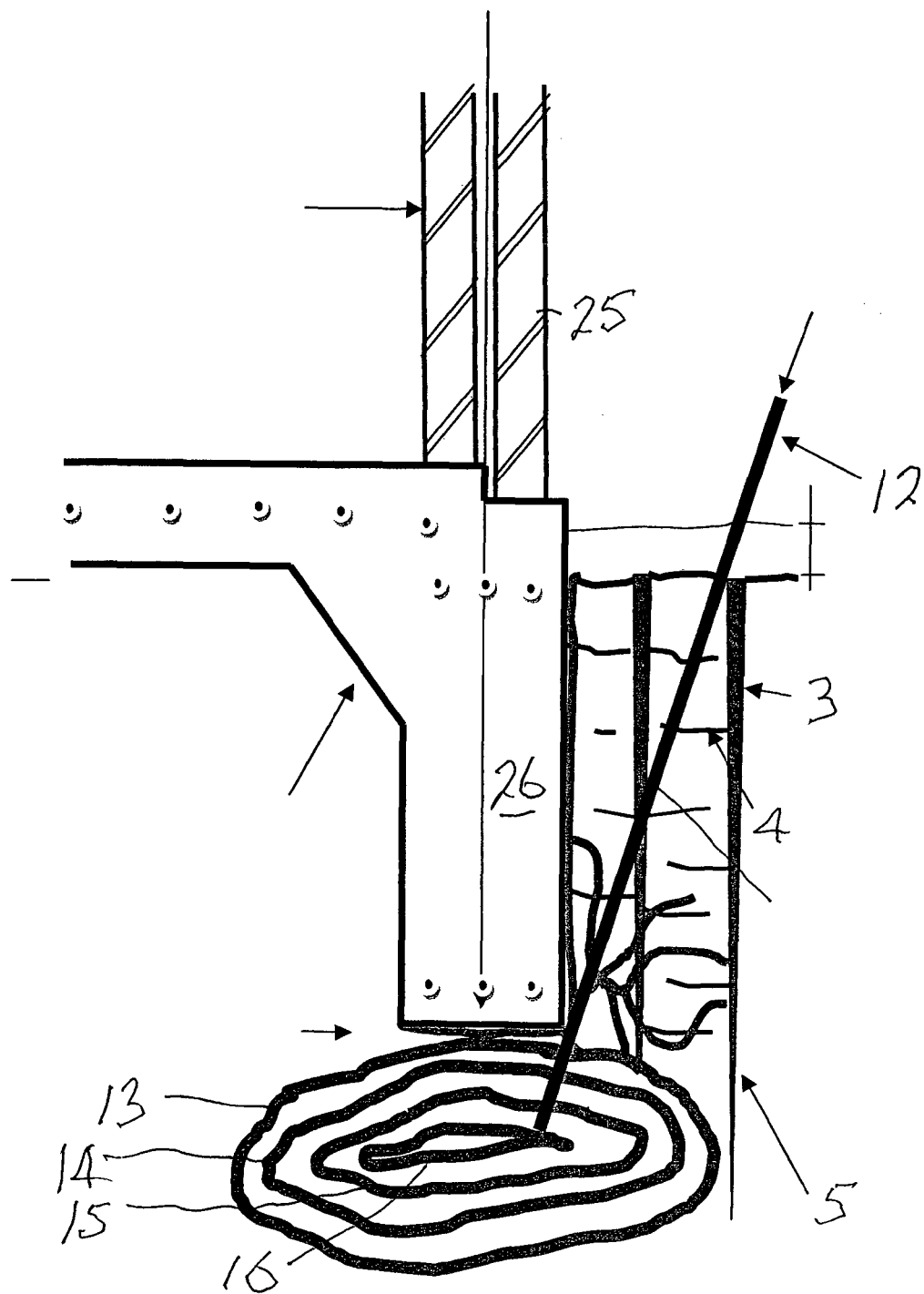
FIG. 23 shows the next step for high reactivity clay/clay composite soils where a reactor rod now has its outlet beneath the footing and a low viscosity slightly foaming urethane is pumped under very high pressure beneath the footing. This is now monitored by observation of the lift in the wall (crack size and alignment are good indicators) and the pumping is repeated now with the reactor rod in the same place until a desired lift of the wall is achieved.
Figure 24:
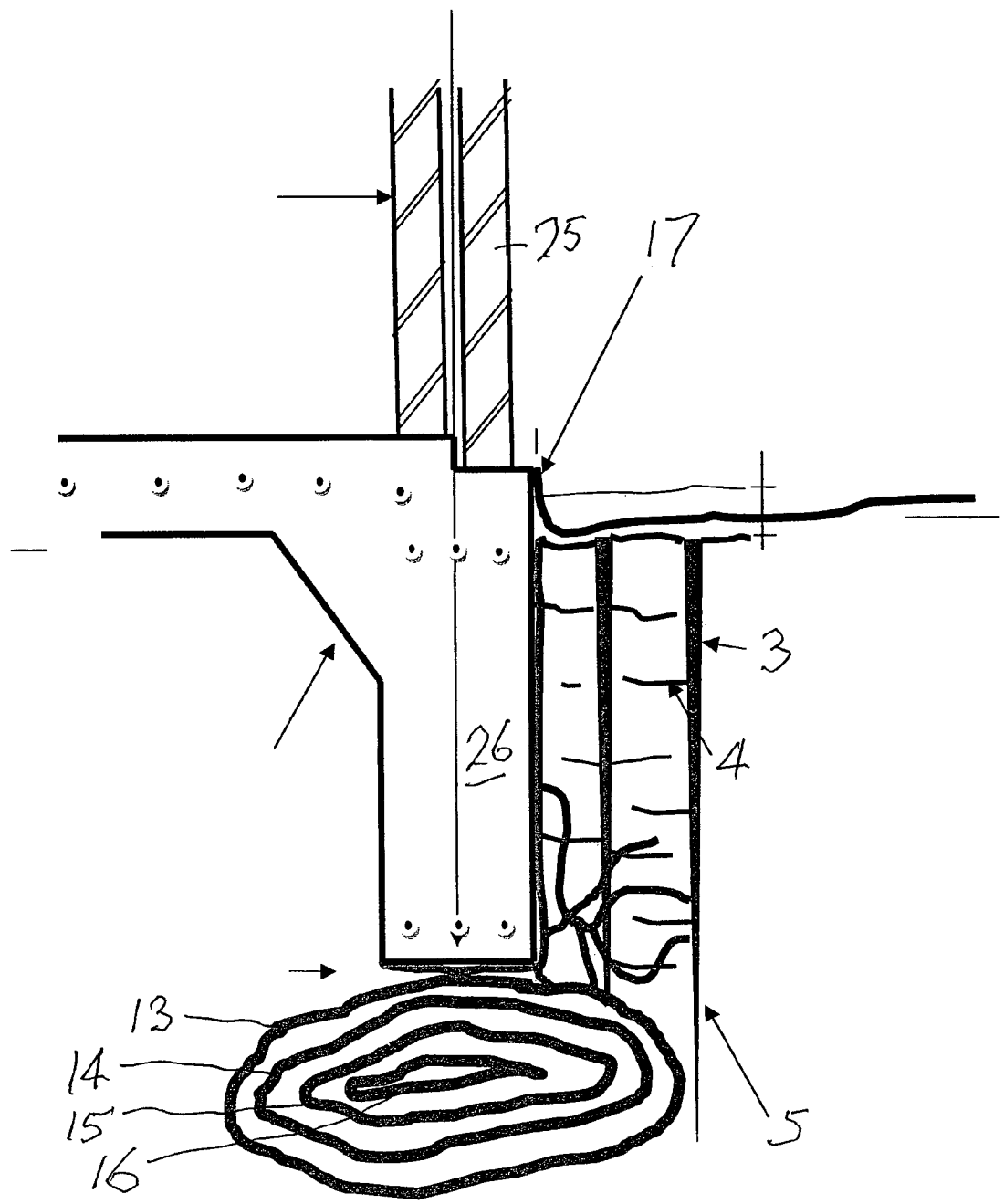
FIG. 24 shows a next step where a water impervious layer is laid across an upper surface of the soil to protect this for the future.

FIG. 6 shows the final step of an embodiment which is to lay a water impervious sealing layer 17 over the top of the surface of the ground around the wall and footing.

To avoid unnecessary descriptive repetition the subsequent drawings describe the same method as applied to different footings so the same references will be given to the same items the differences being that whereas it is a stone wall 1 in FIGS. 1-6 in FIGS. 7-12 it is a double brick cavity wall 20 supported on a strip footing 21.

In FIGS. 13-18 it is a double brick wall 23 supported by a concrete steel composite footing 24.

In FIGS. 19-24 it is a double brick cavity wall 25 supported by a concrete steel composite footing and floor raft made as one element 26.

Many structures that are built on clay and clay composite soils have survived for Hundreds of years without any significant damage. FIGS. 1, 7, 13, and 19 show various types of construction along with our method. Notice that in all cases, there is a 'Buffer Zone', which extends well into the soil. The stable 'Founding Level' is where through depth the Moisture content is stable.

The structures that are damaged are usually built as described in FIGS. 2, 8, 14, and 20. The depth of the summer cracks is such that the "foundation soil" is through variance in moisture content, unstable, through subsequence variance in volume.

Our method for stabilizing the moisture content and naturally compacting moisture sensitive foundation soils and soils supporting a load is to keep the soil dry or to dry it by natural means, and wait until the end of summer see FIGS. 2, 8, 14, and 20. The summer weather has dried out the soil. It is also no problem if the work is urgent, mechanical means. FIGS. 3, 9, 15, and 21 show a method where compressed air (high pressure and low rate of flow) is used. Compressed air is 'Dry Air'. The system is a plurality of tubes 11 into the ground. In most cases the system only needs to be run for a couple of weeks. The compressor runs up, in around 5 minutes to fill a holding tank. It switches off. The holding tank blows off for around 15 minutes, into the ground by means of the plurality of tubes, creating a significant air movement in the ground which in turn dries out the soil. As the holding tank empties the compressor self starts, refilling, and the cycle is repeated over and over. One stops water entering the soil during this process. The soil can be dried out to the same as end of summer conditions see FIGS. 2, 8, 14, and 20.

'Heave State' clay and clay composite foundation soils lose their ability to bear a load when the moisture within has reached a relatively high level, and produces a "plasticity" or "plastic state" within. Clay and clay composite foundation soils in a "plastic state" cannot successfully bear a load. However plastic state soil can have the moisture content reduced naturally or by mechanical means such as the use of compressed air drying.

When the soil is at the optimum dryness and as a result has lost the maximum volume, low viscosity Foaming Urethane which is mixed and chosen to be a slow setting and modest expansion mixture is pumped at high pressure provided by an external high pressure pump and at a slow rate into the soil. This is the 'Caulking Process' as seen in FIGS. 4, 10, 16 and 22. The Urethane is an even two part mix. The pump used to deliver the Urethane is a plural pump that can deliver Urethane parts separately at high pressure, up to 5,000 lbs/square inch, separately in individual hoses. The actual pressure used to pump the mixture will vary depending on the back pressure exerted at the outlet and therefore will be usually less than this full pressure capacity of the pump. However the pressure will be very high and at a minimum would be at least 1000 psi. The pump works on a 'displacement' principal. The pump has additional features that allow other materials to be simultaneously or intermittently, pumped at the same high pressure. The Urethane parts are mixed together by means of a 'static mixer' 30 just as it enters the 'Reactor Rods'. In the reactor rods the material starts to chemically process forming foam.

This extent and speed of foaming however is intended and chosen to be relatively modest and certainly somewhat less than might need to be used to achieve some multiple times its initial volume when in situ.

It may however if left in the open atmosphere expand to more than five times its original volume but this is not a useful guide to its application here.

Some advantage is achieved by incorporating a one way valve in each reactor rod so as to restrict back flow of the slowly setting material while waiting for this to partially set without depending on the pump to hold this back pressure.

The foaming material is forced into the ground as it leaves the ends of the reactor rods, which have been placed in the soil strategically at the required depth. These rods will be inserted with some force and a jack hammer can be used to effect an adequate insertion depth. This has the advantage of sealing around the reactor rod and therefore ensuring that liquid urethane will not escape past the sides of the reactor rods and also required because the high pressure from the external pump can blow them out of the soil. The Urethane follows the path of least resistance, systematically filling all the voids in the soil. The voids include the vertical summer cracks and horizontal fractures. Use of Urethane over other materials, is particularly advantageous. Moisture can act as a 'catalyst' aiding the chemical reaction. The Urethane penetrates and bonds with the soil.

Soil does not dry out 'Low Viscosity' chemically reacting Urethane. Any moisture remaining in the soil is not a disadvantage because it aides the Urethane to bond with and become part of the soil. The aim is to place the Urethane in the cracks, voids and fractures without pushing the soil around. The Urethane foam, solidifies in due course plugging up all the cracks, voids and fractures like a Cork in a Wine Bottle. Water is now prevented from easily entering the soil, as it had done in the past, simply running into the cracks, voids and fractures. While still in their place in the ground the 'Reactor Rods' are cleaned by means of a cleaner which is purged through them also at high pressure. The rods can be re-pumped as required. At the end of the 'Caulking Process' the 'Reactor Rods' are removed.

'Plastic State' clay and clay composite foundation soils lose their ability to bear a load when the moisture within has reached a relatively high level, and produces a "plasticity" or "plastic state" within. Clay and clay composite foundation soils in a "plastic state" cannot successfully bear a load. However plastic state soil can have the moisture content reduced naturally or by mechanical means. It is also no problem if the work is urgent, mechanical means.

When the soil is at an optimum dryness and as a result has lost its swollen volume, low viscosity Foaming Urethane is pumped at high pressure and slow rate into the soil. This is the 'Caulking Process' as seen in FIGS. 4. 10, 16 and 22. The Urethane is an even two part mix. The pump used to deliver the Urethane is a plural pump that can deliver Urethane parts separately at high pressure, up to 5,000 lbs/square inch, separately in individual hoses. The pump works on a 'displacement' principal. The pump has additional features that allow other materials to be simultaneously or intermittently, pumped at the same high pressure. The Urethane parts are mixed together by means of a 'static mixer' just as it enters the 'Reactor Rods'. In the reactor rods the material starts to chemically process forming foam. The slightly foaming material is forced under very high pressure into the ground as it leaves the ends of the reactor rods, which have been placed in the soil strategically with an outlet at the required depth. The 'Reactor Rods' are 'driven' into the soil, by means of a 'jack hammer' so they seal. The seal is used because the high pressure can blow them out of the soil otherwise or they could leak around the sides. The Urethane follows the path of least resistance, systematically filling all the voids in the soil. The voids include the vertical summer cracks and horizontal fractures. Use of Urethane over other materials, is particularly advantageous. Moisture can act as a 'catalyst' aiding the chemical reaction. The Urethane penetrates and bonds with the soil. Soil does not dry out 'Low Viscosity' chemically reacting Urethane. Any moisture remaining in the soil is not a disadvantage because it aides the Urethane to bond with and become part of the soil. The aim is to place the Urethane in the cracks, voids and fractures without pushing the soil around. The Urethane foam, solidifies in due course plugging up all the cracks, voids and fractures like a Calk in a Wine Bottle. Water is prevented from easily entering the soil, as it had done in the past, simply running into the cracks, voids and fractures. The while still in their place in the ground the 'Reactor Rods' are cleaned by means of a cleaner which is purged through them also at high pressure. The rods can be re-pumped as required. At the end of the 'Caulking Process' the 'Reactor Rods' are removed.

Usually the volume of dry clay and clay composite soils can be replaced mechanically—FIGS. 5, 11, 17 and 23 show a method for adding back volume to soil, that has dried naturally or been dried by mechanical means. As a result the clay and clay composite soil has lost volume. When the soil is at the optimum dryness and as a result has lost the maximum volume, low viscosity Foaming Urethane is pumped at high pressure and slow rate into the soil as described in the 'Caulking Process' as seen in FIGS. 4. 10, 16 and 22. as previously described. A similar process using Urethane is an even two part mix to adding volume back to the soil without adding any significant mass. The pump used to deliver the Urethane is a plural pump that can deliver Urethane parts separately at high pressure, up to 5,000 lbs/square inch, separately in individual hoses. The pump works on a 'displacement' principal. The foaming material is forced into the ground as it leaves the ends of the reactor rods, which have been placed in the soil strategically at the required depth. The Urethane is pumped into the soil with a plurality of 'Reactor Rods'. The 'Reactor Rods' are 'driven' into the soil, by means of a 'jack hammer' so they seal. The seal is required because the high pressure can blow them out of the soil or they could leak around the sides. High pump pressure and low rate of flow 'two part' Urethane with Low Viscosity, and slow chemical set time, pumped into clay and clay composite soils consecutively into the same spot in the soil will initially form a Urethane Balloon. When it has all but set, pumping again in to the same spot, will form a balloon within the first balloon. The first Balloon will be collapsed from within, pressed out to the soil forming a Bladder or Tube like arrangement. Consecutive cycles of the same thing will form quite a large lined surface area. This is a significant observation because if this is done as a 'curtain effect' under a wall line load, the hydraulic like effect, adding back volume to the soil strategically along a wall line, can lift the wall or structure above, a bit like blowing air in to a tire. When the Urethane solidifies, volume has been added back to the soil right where it may be required. One of the advantages of High Hydraulic Pressure and slow rate of delivery is control. We can stop at any given instant. If for example we are close cracks in the structure above, we can stop pumping as soon as they close. Using the Urethane material as a self forming bladder is in itself Inventive. The high pressure of the pump can easily overcome the structure of the solidified foam. The surface area of the balloon can be increased as require, and the power of the hydraulic process increased naturally as the surface area increases. Since the Urethane foam is relatively light the natural 'Elastic potential' of the soil is not interfered with. There is negligible mass added the soil.

Long term stability of the structure above will be assured by the strategy as described in FIGS. 6, 12, 18 and 24. An impervious layer (could be a multitude of various materials e.g. concrete path, brick paving, a urethane membrane sheet, etc.) across the surface of the clay and clay composite soils over the already treated areas along the 'load line' protecting the soil from the ingress of moisture. The width distance would not be less in value that the depth of the summer cracks that would have naturally occurred in the soil. This process sets up a 'buffer zone', although horizontal, is similar to the 'buffer zone' in distances, as naturally described in FIGS. 1, 7, 13 and 19. The distance of the 'buffer zone' although created artificially, taking advantage of a natural effect.

The invention claimed is:

1. A method of effecting a stabilization of a portion of a footing of a building, said method comprising the steps of:
   a) drying a portion of soil in a vicinity of a footing;
   b) introducing a water resistant plastic material into said portion of said soil and openings in said soil in said vicinity of said footing to seal said soil;
   c) introducing a two-part polyurethane plastic material to beneath said footing with a pump, said two-part polyurethane plastic material is introduced into said portion of said soil so as to substantially keep said portion of said soil in a position as to prior said step c);
   d) forming a balloon shape in said portion of said soil by introducing of said two-part polyurethane plastic material; and
   e) introducing into said balloon shape by successive injections of said two-part polyurethane plastic material to expand said balloon shape to produce a lifting of said footing;
   wherein said soil is selected from the group consisting of clay, and a clay composite soil;
   wherein said two-part polyurethane plastic material has a predetermined viscosity and a predetermined chemical set time, and wherein said pump is used with a predetermined rate of flow with said two-part polyurethane plastic material.

2. The method as claimed in claim 1 further comprises step f) repeating said step e) into said balloon shape until a predetermined extent of lift of said footing is achieved.

3. The method as claimed in claim 1, wherein said step e) is conducted prior to a setting of said two-part polyurethane plastic material of said step c).

4. The method as claimed in claim 1, wherein said two-part polyurethane plastic material is a foaming urethane plastic.

5. The method as claimed in claim 1 further comprises the step of repeating steps b) and c) along a line of said footing to produce a lifting along said line of said footing.

6. The method as claimed in claim 1, wherein said drying of said soil is accomplished by insertion of hollow rods into said soil and injecting compressed air into said soil through said hollow rods so that said compressed air is in contact with said soil.

7. The method as claimed in claim 1, wherein said pump is at least two pumps each used with a predetermined rate of flow to deliver one part of said two-part polyurethane plastic material, and said pumps each pumping said one part of said two-part polyurethane plastic material at a pressure of 1,000 psi to 5,000 psi.

8. The method as claimed in claim 1 further comprises the step of introducing said two-part polyurethane plastic material into said soil through at least one rod having a one-way valve and a static mixer at an end of said rod, wherein said static mixer is configured to mix parts of said two-part polyurethane plastic material together.

9. The method as claimed in claim 8 further comprises the step of cleaning said rod after each step of introducing said two-part polyurethane plastic material by purging a cleaner through said rod.

10. The method as claimed in claim 8 further comprises the step of driving said rod into said soil to produce a seal between said rod and said soil that prevents said rod from being blown out of said soil in response to said introducing of said two-part polyurethane plastic material.

11. A method stabilizing a portion of a footing of a building, said method comprising the steps of:
   a) drying a portion of soil in a vicinity of a footing by insertion of hollow rods into said soil and injecting compressed air into said soil through said hollow rods so that said compressed air is in contact with said soil;
   b) introducing a water resistant plastic material into said portion of said soil and into openings in said portion of said soil to seal said soil;
   c) introducing a plastic catalyzed monomer into said portion of said soil beneath said footing with a pump, said plastic catalyzed monomer is introduced into said portion of said soil so at to substantially keep said portion of said soil in a position as to prior said step c); and
   d) repeating said step c) until a predetermined extent of lift of said footing is achieved.

12. The method as claimed in claim 11, wherein said plastic catalyzed monomer is a foaming urethane plastic.

13. The method as claimed in claim 11, wherein said plastic catalyzed monomer is a two-part polyurethane plastic material having a predetermined viscosity and a predetermined chemical set time, and wherein said pump is used with a predetermined rate of flow with said two-part polyurethane plastic material.

14. The method as claimed in claim 13, wherein said step d) initially forms a balloon shape of said two-part polyurethane plastic material within step c) of said two-part polyurethane plastic material prior to a setting of said two-part polyurethane plastic material of step c).

15. The method as claimed in claim 11, wherein said step c) forms a balloon shape of said plastic catalyzed monomer, and wherein said step d) is successive injections to expand said balloon shape to produce a lifting of said footing thereabove.

16. The method as claimed in claim 11 further comprises the step of repeating steps a)-d) along a line of said footing to produce a lifting along said line of said footing.

17. The method as claimed in claim 11 further comprises the steps of:
   introducing said plastic catalyzed monomer into said soil through at least one rod having a one-way valve at an end of said rod;
   cleaning said rod after each step of introducing said plastic catalyzed monomer by purging a cleaner through said rod; and
   driving said rod into said soil to produce a seal between said rod and said soil that prevents said rod from being blown out of said soil in response to said introducing of said plastic catalyzed monomer.

18. The method as claimed in claim 11, wherein said pump is at least two pumps each used with a predetermined rate of flow to delivery one part of said two-part polyurethane plastic material, and said pumps each pumping said one part of said two-part polyurethane plastic material at a pressure of 1,000 psi to 5,000 psi.

* * * * *